(12) United States Patent
Gorbunov et al.

(10) Patent No.: US 11,692,968 B2
(45) Date of Patent: Jul. 4, 2023

(54) METHOD AND APPARATUS FOR INTERFACING ION AND MOLECULAR SELECTING DEVICES WITH AN ION COUNTER

(71) Applicant: ANCON TECHNOLOGIES LIMITED, Kent (GB)

(72) Inventors: Boris Zachar Gorbunov, Kent (GB); Michael Douglas Burton, Kent (GB)

(73) Assignee: ANCON TECHNOLOGIES LIMITED, Kent (GB)

( * ) Notice: Subject to any disclaimer, the term of this patent is extended or adjusted under 35 U.S.C. 154(b) by 2 days.

(21) Appl. No.: 17/412,974

(22) Filed: Aug. 26, 2021

(65) Prior Publication Data
US 2022/0065817 A1 Mar. 3, 2022

(30) Foreign Application Priority Data
Aug. 28, 2020 (GB) .................................. 2013553

(51) Int. Cl.
*G01N 27/624* (2021.01)
*G01N 30/62* (2006.01)
*G01N 30/02* (2006.01)

(52) U.S. Cl.
CPC ........... *G01N 27/624* (2013.01); *G01N 30/62* (2013.01); *G01N 2030/025* (2013.01)

(58) Field of Classification Search
CPC ... H01J 49/025; G01N 27/622; G01N 27/624; G01N 30/62
See application file for complete search history.

(56) References Cited

U.S. PATENT DOCUMENTS 7,372,020 B2 * 5/2008 Gorbunov ............. H01J 49/025
250/281
2009/0238723 A1 9/2009 Guharay
(Continued)

FOREIGN PATENT DOCUMENTS

EP 3182111 A1 6/2017
GB 2476603 A 6/2011
(Continued)

OTHER PUBLICATIONS

B. Gorbunov, "Counting individual ions in the air by tagging them with particles", Chemical Physics, 492 (2017), 1-4.
(Continued)

*Primary Examiner* — David E Smith
*Assistant Examiner* — Hsien C Tsai
(74) *Attorney, Agent, or Firm* — Heslin Rothenberg Farley & Mesiti P.C.

(57) ABSTRACT

An apparatus comprising an ion selecting device; an individual ion counter device; and an interface device integral with the ion selecting device and downstream of an ion separating chamber of the ion selecting device. The interface device comprises a tagging particle generator and a tagging chamber. Sample gas containing ions of a selected mobility enters the tagging chamber from the ion selecting device and is exposed to uncharged neutral tagging particles from the tagging particle generator. The ions collide with the tagging particles to form a mixture of tagged ions and uncharged neutral tagging particles which is then separated in a tagged ions separator forming part of the individual ion counting device before the separated tagged ions are counted.

19 Claims, 11 Drawing Sheets

(56) References Cited

U.S. PATENT DOCUMENTS

| | | |
|---|---|---|
| 2010/0282966 A1 | 11/2010 | Schneider et al. |
| 2012/0326023 A1 | 12/2012 | Kozole |
| 2021/0063349 A1* | 3/2021 | Rodier ................ G01N 27/622 |

FOREIGN PATENT DOCUMENTS

| | | |
|---|---|---|
| WO | 2011/144897 A1 | 11/2011 |
| WO | 2013/171569 A1 | 11/2013 |

OTHER PUBLICATIONS

M. Burton & B. Gorbunov, "NMT—A new individual ion counting method: Comparison to a Faraday cup" Chemical Physics, 502 (2018), 60-65.
R. Cumeras et al., "Review on Ion Mobility Spectrometry. Part 1: Current Instrumentation", Analyst. Mar. 7, 2015; 140(5): 1376-1390 (Author manuscript—HHS Public Access).
UKIPO Search Report on GB2013553.9 dated May 20, 2021.
UKIPO Search Report on GB2112226.2 dated Feb. 15, 2022.

* cited by examiner

METHOD AND APPARATUS FOR INTERFACING ION AND MOLECULAR SELECTING DEVICES WITH AN ION COUNTER

CROSS REFERENCE TO RELATED APPLICATIONS

This application claims priority to Great Britain application number GB 2013553.9, filed on Aug. 28, 2020, the entire contents of which are hereby incorporated by reference herein.

FIELD OF THE INVENTION

This invention describes a method and apparatus for interfacing an ion mobility spectrometer (IMS) with an ion counter, for example an ion counter of the type disclosed in U.S. Pat. No. 7,372,020, to increase the sensitivity of the detection of various compounds in a gaseous medium. More particularly, the invention enables the replacement of a conventional electrometer ion detector based upon the Faraday cup/plate with the ion counter disclosed herein, increasing the sensitivity of the ion counter and enabling the quantification of extremely low concentrations of molecules in gases.

BACKGROUND TO THE INVENTION

An example of ion selecting device is an ion mobility spectrometer (IMS). Ion mobility spectrometry was developed to quantify amounts of trace compounds in the air, see for example the book titled "Plasma chromatography" (see References). It is widely used for many security applications; for example to detect explosives in airports (G. A. Eiceman, Ion-mobility spectrometry as a fast monitor of chemical composition, Trends In Analytical Chemistry).

An IMS device typically comprises an ionisation chamber, a drift tube and an electric current-measuring means. A sample of air containing molecules of interest is ionised in an ionisation chamber which is equipped with a Bradbury-Nielsen (BN) gate. At some time the BN gate is open for a short time and ions are pulled into the drift tube section by an electric field. Normally in the drift tube, a linear electric field spatially separates ions of different mobility. Therefore, ions with greater mobility reach the electric current-measuring means (e.g. an electrometer) earlier, and ions with lower mobility reach it later. Thus an electrometer will detect different ions as separate signals at different times. The mode of action of an IMS is similar to the action of the time-of-flight analyser used in mass spectrometry.

There is increasing demand for more sensitive explosives detection technologies for a wide range of homeland security applications, particularly transport security. The low vapour pressure of some explosives presents challenges to current IMS devices. An even greater challenge is to detect concealed explosives in small quantities. A new and more sensitive ion detector is required to meet these needs.

The electrometer of an IMS is based upon a Faraday cup or plate where ions impinge on a collector and carry an electric charge. The voltage drop across a standard resistor connected to the collector enables the ion current to be quantified. The voltage signal from the resistor is then amplified by an amplifier circuit. The measured and amplified ion currents are directly proportional to the number of ions. Therefore, the response of the Faraday cup depends upon the number of ions captured by the collector. The principal disadvantage of the Faraday cup is that the low detection threshold of ions is relatively high, with the limit being set by its amplification circuit and electrical thermal noise. This prior art method has reached its physical limit in modern IMS devices and cannot be used to improve further the detection sensitivity to the level of extremely low concentrations of ions in gases.

U.S. Pat. No. 7,372,020 discloses an ion counting means that enables sensitivity to be increased considerably. Ions in a steady flow sample are counted individually by colliding the ions in a mixing chamber with a numerical excess of uncharged (neutral) aerosol particles (suitably glycerol) entrained in air, to transfer respective charges from the ions to charge individual aerosol particles, and passing the gases through a separating chamber subjected to an electric field to direct only the charged aerosol particles to an optical particle counter.

This method overcomes problems caused by thermal electric noise in the amplifying circuit of a Faraday cup by replacing an electrometer circuit with physical amplification of the volume of ions by up to 1 billion times (the volume of particles is much larger than the volume of ions).

The detection time of an ion counting device ranges from 1 second down to a small fraction of second. However, in currently available ion counters the detection time is 1 second. An IMS apparatus requires much faster detection below the millisecond level. Therefore, it is not possible to connect an IMS directly to an ion counter to detect ions of certain mobility selectively without detecting all the ions passing through the drift tube.

Another example of an application that may benefit from interfacing with an individual ion counting device is a gas chromatograph. In gas chromatography (GC), a gas sample containing various analytes is passed through a column containing a stationary phase where different molecules are adsorbed to differing extents on the stationary phase and therefore exit the column at different times (retention times), thereby bringing about separation of the analytes. GC is widely used for trace amount detection and identification. However, interfacing a GC with an Individual Ion Counter (IIC) is not a trivial matter because molecules coming out of the GC column do not carry any charge and the sample flow rate is extremely low. In addition, a GC peak detection time is typically shorter than the detection time of an ion counter. Therefore, as an IMS, it is similarly not possible to connect a GC directly to an ion counter.

THE INVENTION

The present invention provides an apparatus which contains an interface that enables an IMS, a GC or another ion-selecting or molecule-selecting device to be combined with an Individual Ion Counter (IIC) device to count ions of a certain predetermined mobility or molecules with a certain retention time thereby selectively avoiding interference from other ions.

In a first aspect, the invention provides an apparatus comprising:
 (i) an ion selecting device;
 (ii) an individual ion counter device;
 (iii) an interface device integral with the ion selecting device and being located downstream of an ion separating chamber of the ion selecting device, the interface device comprising a tagging particle generator and a tagging chamber, the tagging chamber having:
  a sample ion inlet;
  a tagging particle inlet; and a extraction outlet;

the individual ion counting device being one which has a tagged ions separator for separating tagged ions and a tagged ion counter but preferably does not have its own operational tagging chamber and tagging particle generator;

the sample ion inlet being arranged to receive from the ion selecting device a sample gas containing a cloud of ions of a selected mobility; the tagging particle inlet being in fluid communication with a gas conduit supplying uncharged neutral tagging particles from the tagging particle generator; and the extraction outlet being in fluid communication with the tagged ions separator of the individual ion counter device;

wherein the apparatus is set up so that in use the cloud of ions of selected mobility entering the tagging chamber through the sample ion inlet is exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are counted after being separated from the uncharged neutral tagging particles;

and wherein the apparatus is set up so that the tagging chamber has an outlet flow rate ($Q_{out}$) which is greater than a flow rate ($O_{tag}$) of neutral tagging particles into the tagging chamber through the tagging particle inlet, thereby to prevent tagging particles from entering the ion selecting chamber by reverse flow through the sample ion inlet.

In a second aspect, the invention provides an apparatus comprising:

(i) an ion selecting device which is an ion mobility spectrometer;

(ii) an individual ion counting device which comprises a tagged ions separator and a tagged ions counter selected from an optical particle counter and a condensation particle counter;

(iii) an interface device integral with the ion selecting device and being located downstream of an ion separating chamber of the ion selecting device, the interface device comprising a tagging particle generator and a tagging chamber, the tagging chamber having:

a sample ion inlet;

a tagging particle inlet; and an extraction outlet;

the individual ion counting device being one which does not have its own operational tagging chamber and tagging particle generator;

the sample ion inlet being arranged to receive from the ion selecting device a sample gas containing a cloud of ions of a selected mobility; the tagging particle inlet being in fluid communication with a gas conduit supplying uncharged neutral tagging particles from the tagging particle generator; and the extraction outlet being in fluid communication with the tagged ions separator of the individual ion counter device;

wherein the apparatus is set up so that in use the cloud of ions of selected mobility entering the tagging chamber through the sample ion inlet is exposed to an excess (relative to the number of ions) of uncharged neutral tagging particles (nanoparticles, submicron particles or micron size particles) so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;

and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber by reverse flow through the sample ion inlet.

In the apparatus of the invention, the tagging particle generator is typically in close proximity to the tagging chamber. By minimising the length of any conduit between the tagging particle generator and the tagging chamber, and thereby minimising the distance that the tagging particles have to travel between the generator and tagging chamber, the background noise caused by cosmic rays ionising the tagging particles before they reach the tagging chamber can be kept to a minimum.

The tagging particle generator generates an aerosol typically comprising aerosol particles having a diameter in the range from 10 nm to 20,000 nm and more usually in the range from 50 nm to 1,000 nm. More usually, the tagging particle diameters are in the range from 100 nm to 300 nm.

The aerosol tag generator can be of the type disclosed in U.S. Pat. No. 7,372,020 B2, the contents of which are incorporated herein by reference. Thus, for example, it may comprise:

an aerosol generator chamber with a clean (no particulate matter) air flow inlet; aerosol outlet in fluid communication with the interface device;

a liquid working fluid container with a working fluid supply conduit;

a heating element, a porous material with developed capillary system to transport the working fluid from the fluid container to a heating element that is in thermal contact with the porous material, where the said working fluid evaporates and generate substantially high vapour concentration;

a cooling region of the generator where saturated vapour is cooled down or closer to the room temperature and form tag aerosol particles due to gas-to-particle-conversion mechanism or nucleation.

In this way, the aerosol tagging particles can be formed by gas-to-particle-conversion from a liquid such as water, glycerol or dialkyl sebacates such as dioctyl sebacate.

The interface device can comprise a main body whereby the tagging particle generator and tagging chamber are an integral part of (e.g. integrally formed with) the main body. Alternatively, the tagging particle generator can be non-integrally formed with the main body but can instead be located in close proximity to the main body and connected to the tagging chamber of the interface by a (preferably short) conduit.

The ion selecting device can be any device which separates ions according to their mobilities in an electric field. For example, the ion selecting device can be an ion mobility spectrometer (IMS) such as a Drift Time Ion Mobility Spectrometer (DTIMS), a Field Asymmetric waveform Ion Mobility Spectrometer (FAIMS), a Differential Mobility Spectrometer (DMS), a Differential Mobility Analyser (DMA), and a Variable Electric Field Mobility Analyser (VEFMA) (e.g. as disclosed in U.S. Pat. No. 8,378,297).—see Cumeras et al. (2015). A particular DMA is the DMA disclosed in U.S. Pat. No. 10,458,946 (Ancon Technologies Limited). The contents of each of U.S. Pat. No. 8,378,297 and 10,458,946 are incorporated herein by reference The terms "ion" and "ions" as used herein includes not only atomic and molecular ions (for example ionised explosives molecules) but also ionised nanoparticles.

In the apparatus of the invention, the Faraday cup or plate with the electrometer of an IMS is replaced by the interface and is connected to an individual ion counter.

An IMS comprises an ionisation chamber having a sample gas inlet through which a sample gas can enter the ionisation chamber, the ionisation chamber being provided with an ion-creating device for creating ions from components of the sample gas.

The sample gas can be any gas containing components that are capable of being ionised and the ions detected. The sample gas enters the ionisation chamber and is exposed to an ion-creating device. The ion-creating device, which can be entirely conventional and of a type typically found in known IMS devices (see for example U.S. Pat. No. 7,372,020), can be for example a corona discharge ioniser or a UV ioniser. Other types of ionisation method include radioactive atmospheric pressure chemical ionization (R-APCI) by a β-source from a small foil of radioactive nickel-63 ($^{63}$Ni), and also the beta emitting tritium (T or $^3$H) and the alpha emitting americium-241 ($^{241}$Am).

The ion mobility spectrometer also comprises a time-of-flight ion separation chamber. The ion separation chamber is in fluid communication with the ionisation chamber and the flow of ions into the ion separation chamber is controlled by the first ion gate which can be, for example, a Bradbury Neilson ion gate. The ion separation chamber has one or more electric field-creating elements for creating an electric field for separating ions of differing mobilities. The electric field-creating elements, which can take the form of a plurality of electrode plates arranged at intervals along the length of the ion separation chamber, are preferably configured and arranged to create a linear electric field along the length of the ion separation chamber by means of gradually changing electric potential difference applied to the electric field-creating elements.

At the downstream end of the ion separation chamber, the passage of ions out of the chamber and into the tagging chamber is preferably controlled by an ion-flux control element such as an ion gate (e.g. a Bradbury Neilsen ion gate or an electrode ion gate). This addresses the issue of the difference between the IMS timescale and the detection time of an individual ion counter.

Thus, the use of an interface device of the invention comprising an ion-flux control element such as an ion gate is particularly advantageous in providing an interface between an IMS and an individual ion counter and enables replacement of the Faraday cup/plate detecting devices used in known ion mobility spectrometers with more sensitive individual ion counting devices. The opening and closing of the ion gate at the upstream end of a drift tube of an IMS and the ion flux controlling device (e.g. ion gate) in the interface device can be synchronised and controlled using an electronic controller so that only ions of a particular ion mobility of selected range of ion mobilities pass through the ion flux controlling device and into the tagging chamber. The advantages that arise from such an arrangement are discussed below.

In the interface (ion tagging) chamber, the ions collide with tagging particles (tags) which are typically aerosol liquid or solid particles generated in an aerosol generator linked to the tagging chamber. The collision between the aerosol particles and ions results in charge being transferred to the aerosol particles. A mixture of charged and uncharged aerosol particles is then extracted from the tagging chamber through the extraction outlet towards the individual ion counting device where the charged and uncharged aerosol particles are separated in an electric field and the charged particles are counted.

The individual ion counting device forming part of the apparatus of the invention is preferably one which does not have its own operational tagging chamber and tagging particle generator; i.e. either the IIC does not have its own tagging chamber or tagging particle generator, or any tagging chamber or tagging particle generator that it does have has been rendered non-operational or has been bypassed. Because the tagging chamber and tagging particle generator form part of the interface device, the length of conduit required between the tagging particle generator and the interface can be minimised thereby reducing background noise caused by cosmic rays penetrating through the conduit and ionising gas molecules and tagging particles.

The ion counting device typically comprises a tagged ions separator and a tagged ions counter.

The tagged ions separator separates the tagged ions from the uncharged neutral tagging particles before the tagged ions are counted by the tagged ions counter.

The tagged ions separator typically comprises:

a separation chamber with two electrodes to generate an electric field and a sheath flow inlet, sheath flow outlet, another inlet with a fluid communication with the interface to receive a mixture of tagged ions and neutral (without electrical charge) tags as well as a tagged ions outlet that is in fluid communication with the optical particle counter or condensation particle counter;

the sheath flow typically generated by at least one pump and equipped with aerosol particle HEPA filters, flow stabilising elements and flow controlling means;

wherein the electric field and the flow rates of all flows are chosen to deflect the tagged ions to the tagged ion outlet and direct neutral tags into the sheath flow outlet. A person skilled in the art would readily be able to choose appropriate flow rates and the electric field strength for a device described.

An example of a tagged ions separator is the separator described in U.S. Pat. No. 7,372,020.

The ion counting device (or tagged ions counter) may comprise an individual ion counter device with an optical particle counter or condensation particle counter or it may be, for example, an electrometer. In one particular embodiment, the ion counting device is an optical particle counter. By tagging the ions with the neutral aerosol particles to create charged particles of a considerably larger size than the original ions in the sample gas, the ions can readily be counted by the tagged ion counter of the optical particle counter. Thus, ions are individually counted.

It follows from the above that, according to one embodiment of the invention, an ion mobility spectrometer equipped with an interface device as defined herein connected to an individual ion counting device enables detection of analytes at considerably lower concentrations than a conventional IMS with a Faraday plate and electrometer detector.

Whereas the interface device of the invention is particularly useful when combined with an IMS, it may also be used in conjunction with a molecule selecting device such as a gas chromatagraph. The separated components emerging from a gas chromatagraph are typically neutral uncharged molecules and therefore require ionising before they can be detected using the ion-tagging principle. In order to allow the detection and quantification of neutral molecules such as those emerging from a gas chromatagraph, the interface device of the invention can be provided with an ionisation chamber upstream of the tagging chamber.

Accordingly, in another aspect, the invention provides an apparatus comprising:

(i) a molecule selecting device (such as a gas chromatagraph);

(ii) an individual ion counter device;

(iii) an interface device integral with the molecule selecting device and being located at a downstream outlet thereof, the interface device comprising (a) an ionisation chamber containing an ionising device for ionising molecules received from the molecule selecting device; and (b) a tagging chamber, wherein the tagging chamber has:

a sample ion inlet for receiving ions from the ionisation chamber;

a tagging particle inlet, and a extraction outlet;

the sample ion inlet being arranged to receive a cloud of ions from the ionisation chamber; the tagging particle inlet being in fluid communication with a gas conduit supplying uncharged neutral tagging particles from a tagging particle generator connected thereto; and the extraction outlet being in fluid communication with the individual ion counter device;

the tagging chamber being formed from an electrically conductive material or a material treated to render it electrically conductive;

wherein the apparatus is set up so that selected molecules leaving the molecule selecting device enter the ionisation chamber where they are ionised and then enter the tagging chamber through the sample ion inlet whereupon they are exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the individual ion counting device where the tagged ions are counted;

and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ionisation chamber through by reverse flow through the sample ion inlet.

In a further aspect, the invention provides an apparatus comprising:

(i) a molecule selecting device;

(ii) an individual ion counter device which comprises a tagged ions separator and a tagged ions counter selected from an optical particle counter and a condensation particle counter;

(iii) an interface device integral with the molecule selecting device and being located at a downstream outlet thereof, the interface device comprising (a) an ionisation chamber containing an ionising device for ionising molecules received from the molecule selecting device; (b) a tagging particle generator; and (c) a tagging chamber, wherein the tagging chamber has:

a sample ion inlet for receiving ions from the ionisation chamber;

a tagging particle inlet, and an extraction outlet;

the individual ion counting device being one which does not have its own operational tagging chamber and tagging particle generator;

the sample ion inlet being arranged to receive a cloud of ions from the ionisation chamber; the tagging particle inlet being in fluid communication with a gas conduit supplying uncharged neutral tagging particles from the tagging particle generator; and the extraction outlet being in fluid communication with the tagged ions separator of the individual ion counter device; the tagging chamber being formed from an electrically conductive material or a material treated to render it electrically conductive;

wherein the apparatus is set up so that selected molecules leaving the molecule selecting device enter the ionisation chamber where they are ionised and then enter the tagging chamber through the sample ion inlet whereupon they are exposed to an excess (relative to the number of ions) of uncharged neutral tagging particles so that the ions collide with the tagging particles and electrically charge them to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;

and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ionisation chamber through by reverse flow through the sample ion inlet.

When the molecule selecting device is a gas chromatagraph, the interface device and individual ion counting device can be used to replace the detectors (e.g. flame ionisation detectors and electron capture detectors) typically used in gas chromatagraphs.

The interface device of the invention can form an integral part of an ion selecting device or molecule selecting device as indicated above. However, the interface device can be provided as a standalone unit for incorporation into an apparatus of the invention as defined herein.

Accordingly, in another aspect, the invention provides an interface device for connecting an ion selecting device to an individual ion counter device; the interface device comprising an tagging chamber having:

a sample ion inlet;

a tagging particle inlet; and a extraction outlet;

the sample ion inlet being arranged to receive a cloud of ions of a selected mobility from the ion selecting device; the tagging particle inlet being in fluid communication with a gas conduit supplying uncharged neutral tagging particles from a tagging particle generator connected thereto; and the extraction outlet being connectable to the individual ion counter device;

wherein the interface device apparatus is operable so that the cloud of ions of selected mobility entering the tagging chamber through the sample ion inlet is exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the individual ion counting device where the tagged ions are counted;

and wherein the interface device is operable so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber through by reverse flow through the sample ion inlet.

In each of the foregoing aspects and embodiments of the invention, in order to provide better control over the flow of ions into the interface device, an ion-flux control element can be located at or adjacent the sample ion inlet, the ion-flux control element being operable to control the flow of ions into the tagging chamber from the ion selecting device or ionisation chamber as the case may be.

The ion-flux control element can be an ion gate such as a Bradbury Neilsen ion gate or an electrode ion gate.

In one embodiment of the present invention, when the interface device is provided with an ion gate, and the ion selecting device is an IMS and has its own ion gate (the upstream ion gate) controlling the flow of ions into an upstream end of its drift tube, either or both (and preferably both) ion gates are Bradbury Nielsen (BN) ion gates.

When the ion selecting device is an IMS, the arrangement of the components of the IMS and interface device are typically such that the extraction outlet of the tagging chamber is in line with both the upstream ion gate of the IMS and the ion gate in the tagging chamber; i.e. the extraction outlet and the two ion gates lie on a common axis extending through the IMS.

The positioning of the tagging particle (e.g. aerosol) inlet relative to the extraction outlet can vary. In one embodiment, the tagging aerosol inlet is disposed laterally (e.g. orthogonally) with respect to a direct flow path between the second ion gate and the outlet of the interface/tagging chamber.

In another embodiment of the present invention there is a plurality of tagging particle inlets inside the tagging chamber connected to a single tagging particle generator.

In another embodiment, the extraction outlet of the tagging chamber extends into an extraction conduit for connection to an individual ion counter, and a manifold at least partially surrounds the extraction conduit, the manifold being connected to, or being connectable to, the tagging particle generator, and the manifold having an opening which serves as the tagging particle inlet. In this embodiment, the manifold may comprise a tubular (e.g. cylindrical) structure surrounding the extraction conduit (and typically co-axial therewith) and the tagging particle inlet is constituted by one or more openings at an inner end of the manifold. The tagging particle inlet may be constituted by an annular opening at the said inner end of the manifold. The annular opening typically faces the ion gate in the tagging chamber.

In order to draw charged particles towards the individual ion-counting device, a graduated electric potential difference can be applied to the extraction outlet or the extraction conduit (when present).

In one embodiment of the invention, an ion mobility spectrometer, the ion gate in the tagging chamber, the tagging chamber, the extraction conduit and the manifold are aligned on a common axis.

In each of the foregoing aspects and embodiments of the invention, the extraction outlet of the tagging chamber may be positioned at a distance from the ion gate of from 0.1 mm to 150 mm, for example from 3 mm to 20 mm.

A selected electric potential difference may be applied to different sections of the tagging chamber including but not limited to the tagging particle inlet, a B-N gate, the extraction outlet and internal surfaces of the tagging chamber.

In one embodiment, selected potential differences (voltages) are applied to both the tagging particle inlet and the extraction outlet (extraction conduit).

In each of the foregoing aspects and embodiments of the invention, the tagging particle inlet is typically positioned at a distance from the ion gate of from 1 mm to 150 mm, for example at a distance from the second ion gate of from 3 mm to 20 mm.

The flow rates of the tagging particles into the tagging chamber and the tagged and untagged particles through the extraction outlet may be varied as required.

Thus, in one embodiment, the flow rate of tagging particles into the tagging chamber and the flow rate of tagged and untagged particles through the extraction outlet are substantially equal: $Q_{tag}=Q_{out}$.

In another embodiment, the flow rate of tagged and untagged particles through the extraction outlet is greater than the flow rate of tagging particles into the tagging chamber: $Q_{out}>Q_{tag}$ In some embodiments of the invention, the tagging chamber comprises two compartments; wherein the first of the two compartments receives untagged ions from the ion selecting device or the ionisation chamber; the second of the two compartments is further from the sample ion inlet than the tagging compartment; and the tagging particle inlet opens into the second compartment; and wherein the second compartment is configured and arranged relative to the first compartment such that a sheath flow of the uncharged neutral tagging particles is created which surrounds ions entering the extraction outlet.

In this embodiment, the uncharged neutral tagging particles can flow from the tagging particle inlet towards the extraction outlet is in a direction opposite to a direction of flow of the cloud of ions from the sample ion inlet towards the extraction outlet. In this way, a funnel effect is created at the extraction outlet such the mixture of ions and tagging particles is surrounded by a sheath flow of uncharged neutral tagging particles as it enters the extraction outlet and flows along the extraction conduit. An advantage of this arrangement is that it prevents or reduces ion loss arising from contact with electrically conducting surfaces.

When the extraction outlet is an open end of a extraction conduit, the extraction conduit can extend through the second compartment so as to create an annular channel along which the uncharged neutral tagging particles pass from the tagging particle inlet towards the extraction outlet. Thus, for example, the extraction conduit can extend along an entire length of, or the greater part of the length of, the second compartment. The annular channel can have a region of reduced width, the region of reduced width being located between the tagging particle inlet and the extraction outlet. The region of reduced width can be provided by an annular baffle which extends radially inwardly from a wall of the second compartment part way towards the extraction conduit.

In some embodiments of the invention, the interface device can comprise a gas flow control zone upstream of the tagging chamber (e.g a first compartment thereof where it comprises two chambers), wherein an inner peripheral wall of the interface in the control zone is provided with one or more openings or channels through which:

(a) a supply of clean gas (e.g. clean air) can be provided to form a clean gas (e.g. air) stream into the IMS drift tube (when present); or (b) a supply of clean gas (e.g. clean air) can be introduced into the tagging compartment; or (c) a supply of clean gas (e.g. clean air) can be introduced into both the tagging compartment and the IMS drift tube (when present); or (d) a fraction of a gas flow from the IMS drift tube (when present) can be extracted.

A potential problem which was encountered with earlier prototypes of the present apparatus is that there can be a backflow of aerosol tagging particles into the IMS device thereby leading to fouling and malfunction of the IMS device. To prevent this from occurring, the apparatus is set up so that the tagging chamber has an outlet flow rate ($Q_{out}$) which is greater than a flow rate ($O_{tag}$) of neutral tagging particles into the tagging chamber through the tagging particle inlet, thereby to prevent tagging particles from entering the ion selecting chamber by reverse flow through the sample ion inlet.

IMS devices often make use of a countercurrent of neutral gases (e.g. nitrogen, helium or argon) in the drift tube to remove unwanted neutral molecules and aerosol particle contaminants present in the sample. In the present invention therefore, a flow homogeniser provided with a clean gas (e.g. air) flow inlet may be located near to the the second ion gate to prevent contamination of the IMS.

A flow homogeniser for providing a clean gas flow back into the drift tube may comprise an arrangement in which the inner peripheral wall of the interface in the control zone of the above embodiment is provided with an annular channel which is open on a radially inner side thereof and which is coaxial with a common axis extending through the drift tube (when present) and tagging chamber, wherein the annular channel is in fluid communication with one or more openings to the exterior of the interface through which clean gas (e.g. air) can be introduced or the said fraction of the gas flow from the drift tube withdrawn.

It will be appreciated that the flow rate of the clean gas (e.g. air) from the homogeniser into the tagging chamber can be greater than the flow into the drift tube. In this case, a proportion of the flow will be added to the flow entering the extraction outlet. An advantage of this arrangement is that it further reduces the possibility of contamination of the drift tube by preventing tagging particles entering the drift tube.

In each of the foregoing aspects and embodiments of the invention where the interface device is used to connect an IMS with an individual ion counter, the ion gate may be omitted from the interface device and the IMS may be provided with a second ion gate at a downstream end of its drift tube, upstream of the sample ion inlet of the interface device. In this embodiment of the invention, it will be appreciated that the IMS has two in gates, a first ion gate being located adjacent an upstream end of the drift tube so as to control the flow of ions from the ionisation chamber into the drift tube, and a second ion gate located at a downstream end of the drift tube so as to control the flow of ions out of the drift tube and through the sample ion inlet into the interface device. Alternatively, the second ion gate can be located inside the tagging chamber of the interface device rather than inside the downstream end of the drift tube.

In a further aspect, the invention provides a method of counting ions of a selected ion mobility in a gaseous sample using an apparatus as defined herein, which method comprises allowing the ions of selected ion mobility to pass from an ion selecting device though the sample ion inlet into the tagging chamber; exposing the ions to an aerosol of tagging particles so that the ions are tagged by attachment to tagging particles; allowing a mixture of tagged ions and uncharged neutral tagging particles to leave the tagging chamber through the extraction outlet; separating the tagged ions from the uncharged neutral tagging particles; and counting the tagged ions using an individual ion counter.

In one embodiment of the foregoing method, the ion selecting device is an ion mobility spectrometer having an ionisation chamber for forming ions from a gas sample containing an analyte of interest; a drift tube in which separation of the ions is effected by subjecting them to an electric field; and a first ion gate at an upstream end of the drift tube for controlling passage of the ions into the drift tube, wherein a second ion gate either is present at a downstream end of the drift tube in front of the sample ion inlet of the tagging chamber, or is present inside the tagging chamber on a downstream side of the sample ion inlet; and the method comprises:

(i) controlling the timing of the opening and closing of the first and second ion gates to enable the ions to pass from the ionisation chamber through the first ion gate into the drift tube and ions of a selected ion mobility to pass through from the drift tube through the second ion gate into the tagging chamber;

(ii) subjecting the ions of selected ion mobility to a flow of uncharged neutral tagging particles to produce ionised tagging particles (tagged ions);

(iii) extracting ionised tagging particles, non-ionised tagging particles and any residual untagged ions through the extraction outlet of the tagging chamber and directing them to the individual ion counter where tagged ions are extracted, passed through an individual ion counter (such as an optical particle counter) and counted individually.

In the aforesaid methods, an interval between the closing of the first and second ion gates and the opening of the tagging chamber ion gate may be changed in a range from $t_{min}$ to $t_{max}$ (in any order) and measurements of ion counts are repeated to provide an array of data that forms a spectrum of various constituents in a complex gas mixture.

The duration of opening of the second ion gate may be reduced to enable the resolution of the ion counting to be increased. Alternatively, the duration of opening of the second ion gate may be increased to increase the sensitivity of the ion counting.

The above methods enable ions of interest to be selected with an IMS and counted with an ion counting device such as an individual ion counter or electrometer. Molecules of interest are ionised in the ionisation chamber of the IMS and then, when the first ion gate (e.g. a BN ion gate) is opened, the resulting cloud of ions enters the drift tube where it is exposed to an electric field to separate the ions according to their ion mobility as they move towards the second ion gate (e.g. a BN ion gate). After a predetermined delay time has elapsed, the second ion gate is opened, and ions of interest are let through the second ion gate into the tagging chamber. A voltage applied to the extraction outlet (e.g. extraction conduit) generates an electric field that moves ions towards the extraction outlet. Tags (the neutral particles) entering the tagging chamber through the tagging particle inlet are directed to the extraction outlet (extraction conduit) conduit by a flow of carrier gas flowing into the tagging chamber with the tags. This enables ions to be tagged with aerosol particle tags and forms charged tags that are directed through the extraction outlet towards a separation chamber of the individual ion counter where charged tags are separated from neutral non-ionised aerosol particles. In the ion counter, the number of tagged ions is counted, and the resulting number of counts is equal to the number of ions emerging from the separation chamber through the second ion gate. In this way, the ions of interest are counted and numerically quantified.

Often, a sample may contain a number of different molecules. Molecules of different sizes or molecular weights typically have different mobilities. The interface of the invention with an ion mobility spectrometer enables the detection of ions of different mobilities in a range of mobilities as spectra showing a number of different compounds in a complex mixture. To enable a spectrum of ions of different ion mobilities to be obtained, the delay time between opening the first ion gate (e.g. BN gate) and the second ion gate can be varied from the time that corresponds to the lowest mobility to the time that is defined by the highest mobility, or alternatively in the reverse order or indeed any order of mobilities preferred for measurement of the required spectrum of mobilities.

As defined above, the terms "ion" and "ions" as used herein refer not only to atomic and molecular ions but also to ionised nanoparticles. Whereas various types of IMS can be used to select atomic and molecular ions of interest, a Differential Mobility Analyzer (DMA) may be used to separate both atomic and molecular ions and also ionised nanoparticles. In the case of nanoparticles, individual ion counters can be used to cover molecule and particle sizes ranging from molecular ion sizes (~0.2 nm) up to circa 100 nm particles. Conventional methods of detecting nanoparticles typically involve the use of Condensation Particle Counters which have very poor detection efficiency for particles with diameters below 10 nm. By contrast, the apparatus and method of the present invention provide a high detection efficiency across the entire nanoparticle size range. Thus the invention enables the detection of a range of small airborne species ranging from individual atoms and molecules up to nanoparticles.

As discussed above, the ion selecting device can be any device which separates ions according to their mobilities in an electric field. For example, the ion selecting device can be an ion mobility spectrometer (IMS) such as a Drift Time Ion Mobility Spectrometer (DTIMS), a Field Asymmetric waveform Ion Mobility Spectrometer (FAIMS), a Differential Mobility Spectrometer (DMS), a Differential Mobility Analyser (DMA), and a Variable Electric Field Mobility Analyser (VEFMA) (e.g. as disclosed in U.S. Pat. No. 8,378,297B2)—see Cumeras et al. (2015).

A FAIMS, DMA or a DMS can be connected to an individual ion counter with the same basic interface but the flow rates and geometry will typically be optimised in each ion selecting device separately because the flow rates of ions out of ion selecting devices may or may not be equal to the flow rate in the individual ion counter device. For example, if the FAIMS supplies ions in a flow of air at flow rate 1 l/min and the individual ion counter device requires only 0.3 l/min flow then the rest of the flow (0.7 l/min) should be removed before entering the tagging zone of the tagging chamber.

In order to concentrate ions in a preferred zone for most efficient tagging, an electrode or a plurality of electrode can be used. The electrodes can act as a focusing means to direct an ion cloud to the centre of the extraction outlet. This increases tagging efficiency and reduces tagging time.

When a molecule selecting device such as a gas chromatograph (GC) which does not have its own ionising means is used, the interface device is provided with an ionisation chamber as well as the tagging chamber so that analyte molecules can be ionised before they enter the tagging chamber for tagging. In the case of a gas chromatograph, the flow rate of gas containing analyte molecules coming out of a GC capillary column is normally much smaller than the flow rate required for an individual ion counter. Therefore, it may be advantageous to top up the flow coming out of a GC capillary column with a supplemental flow so that the total flow is close to or equal to the preferred flow rate in the individual ion counter ion sample inlet.

A potential source of inaccuracy in measuring ion concentrations is that the analyte ions may come into contact with the internal surfaces of the tagging chamber and give up their charge. Ion losses can be reduced or prevented by forming a sheath flow of gas (e.g. air) around the ion cloud. This can be achieved for example, in case of an axially symmetrical interface, by employing a clean air flow generating means and a circular slit positioned inside the interface with a flow homogeniser as described earlier. The clean air flow coming out of the slit forms a sheath around the ion cloud and reduces analyte losses. The two compartment arrangements discussed above, where the aerosol tagging particles flow towards the extraction outlet from an opposite direction to the ion cloud flow also helps to establish a sheath flow around the ion cloud as it enters the extraction outlet and extraction conduit.

In a further method of preventing or minimising ion losses, the ion cloud can be subjected to focusing to before it enters the region of the interface chamber where tagging takes place. For example, a number of circular baffles or electrodes made from an electrically conductive material can be used to tighten the ion cloud down to a narrow cord before entering the ion tagging zone. For this, a gradually increasing or decreasing (depending on the charge sign of the analyte ions) electric potential difference can be applied to the baffles. The voltage applied to the electrodes should typically be in the range from 0.0001V to 100,000V depending on the distance between the electrodes. The voltages can be roughly estimated from the expression: $\Delta V/\Delta X=|P|$, where $0<P<30,000$ V/cm. Here P might be positive or negative depending on the ion polarity. The absolute value of the parameter $|P|$ indicates the function Abs( ): $|P|=Abs(P)$.

The interface device of the invention can be made from a variety of materials.

In some embodiments, the interface device is made predominantly from a metal or metal alloy such as stainless steel.

In other embodiments, the interface device is made predominantly from a non-electrically conductive material such as glass, ceramics, polytetrafluorethylene (PTFE), polyether ether ketone (PEEK), or other plastics materials.

When the interface device is formed from a metal or metal alloy, it will typically comprise non-electrically conductive sections to insulate any electrodes that are present in the tagging chamber.

If the tagging chamber is made of a non-electrically conductive material (e.g. glass, ceramics, PTFE, PEEK, or other plastics materials) then some or all of the electrodes can be placed on the exterior of the tagging chamber.

The tagging chamber may be have a cross section which is elliptical (e.g. circular or oval), rectangular or regular polygonal (e.g. triangular, square, pentagonal or hexagonal) as well as combination of these shapes.

In one embodiment, the tagging chamber has axial symmetry.

In a particular embodiment the tagging chamber has axial symmetry and each compartment of the chamber is circular in cross section.

Where a molecule selecting device such as a gas chromatograph is connected to the interface device of the invention, the interface device typically includes an ionisation chamber to ionise the neutral selected analyte molecules before they enter the tagging chamber. A potential problem with this arrangement is that reagent ions may be formed by ionisation of the carrier gas in the ionisation chamber and such reagent ions may reduce the accuracy of the detection and quantifying of the ions of interest by the individual ion counter device. Where such problems are encountered, they can be overcome by placing between the gas chromatograph (or another molecule selecting device) and the interface device an ion selecting device which has its own ionisation chamber and omitting the ionisation chamber from the interface device.

The apparatus and methods of the invention can be used to detect very low concentrations of airborne substances. For example, they can be used to detect explosives in a wide range of homeland security applications, particularly transport security. The low vapour pressure of some explosives presents challenges to current IMS devices and the apparatus and methods of the present invention provide a means of detecting such substances to much a greater level of sensitivity. The apparatus and methods of the invention can also be used in health diagnostics in detecting very low concentrations of volatile disease markers.

BRIEF DESCRIPTION OF THE DRAWINGS

In FIG. 2, the location of the interface is shown by hatching. The interface has axial symmetry.

In FIG. 3a, the location of the interface is shown by hatching.

DETAILED DESCRIPTION OF THE INVENTION

The invention will now be described, by way of example, with reference to the accompanying schematic drawings.

Figure 1:
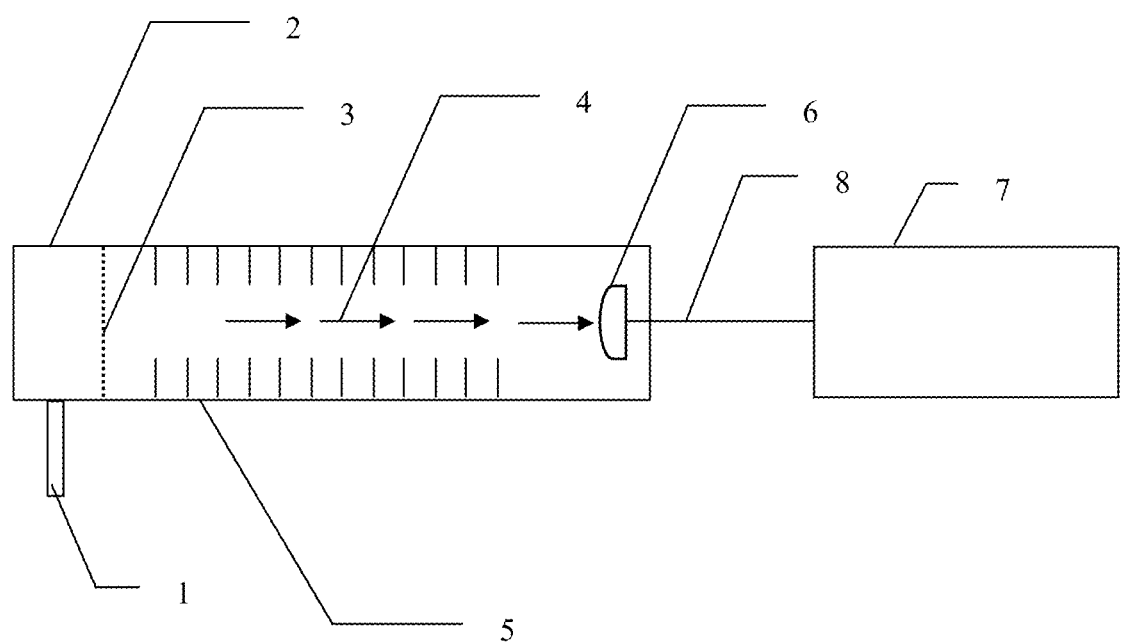
FIG. 1 shows schematically a prior art apparatus for detecting the presence of, and measuring the concentration or mixing ratios of, ions in gases using an ion mobility spectrometer (IMS) with a Faraday cup detector.

FIG. 1 shows a known type of IMS device which has a sample gas inlet (1) leading to an ionisation chamber (2) with ionisation means (not shown) and a Bradbury Neilson (BN) ion gate (3) that controls the flow of ions (4) into an ion separation chamber (drift tube (5)) containing an array of vertical electrodes that generate a horizontal electric field. At the downstream end of the drift tube is a Faraday cup ion collector (6) which is connected to an amplifier (7) by means of a metal conduit (8).

In operation, a gaseous sample containing ions or molecules of interest enters the inlet (1) of the ionisation chamber (2) where molecules of interest and other molecules (e.g. carrier gas molecules such as oxygen and nitrogen) are subjected to ionisation, for example by a corona discharge or UV ioniser (not shown). The resulting cloud of ions stays in the ionisation chamber until the BN gate (3) opens at which point the cloud of ions enters the separation chamber (drift tube) (5). The BN gate is opened for a sufficiently short time and closed again. Once the gate has closed, the ion cloud (4) expands horizontally due to differences in the mobility of ions in the horizontal electric field. Therefore, some ions (those with the greatest ion mobility) reach the Faraday cup ion collector (6) earlier and some (those with the lowest ion mobility) later. This principle is similar to that of a time-of-flight mass spectrometer. The ions colliding with the surface of the Faraday cup generate an electric current that is amplified by an amplifier (7) connected to the Faraday cup (6) by a metal conduit (8). The currents generated by the ions impacting on the Faraday cup are processed by the electronic control circuitry of the IMS to produce a spectrum of peaks corresponding to ions with different mobilities. The magnitude of each peak corresponding to a chosen compound of interest is a proportional representation of the ion current and can readily be converted to give the concentration of a given type of molecule or the ratios of different ions present as a mixture in the sample gas.

Figure 2:
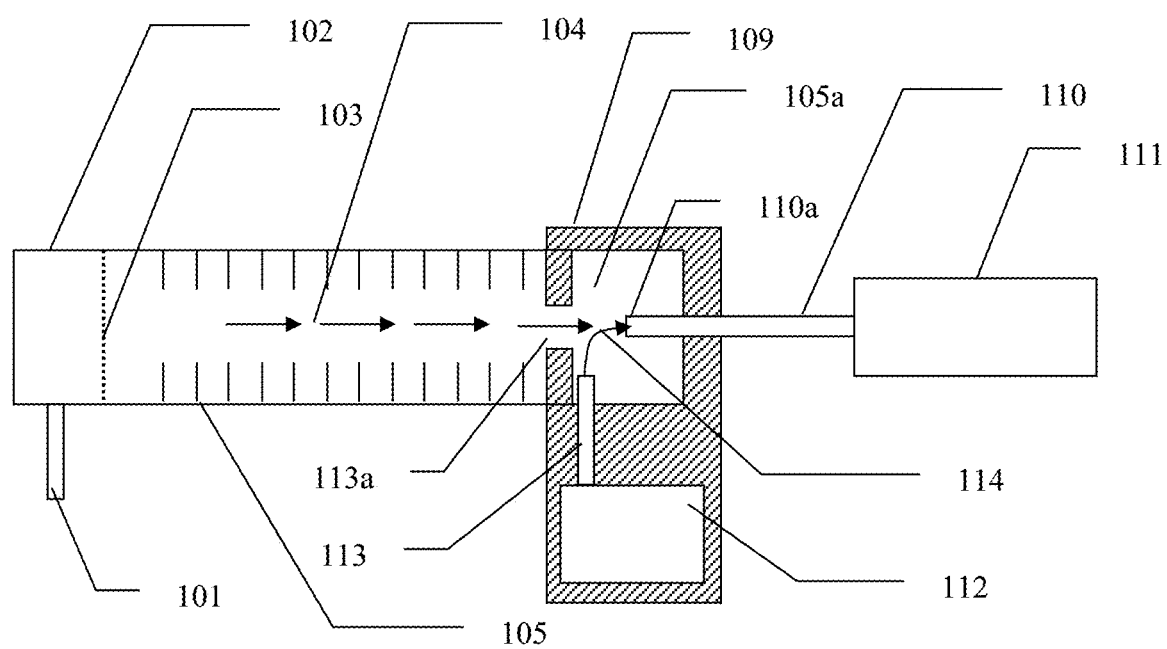
FIG. 2 is a schematic cross sectional view of an interface according to one embodiment of the invention positioned between an IMS and an Individual Ion Counter (IIC).

FIG. 2 illustrates schematically an interface positioned between an IMS and an IIC device. The IMS instrument is of similar construction to the device of FIG. 1, except that the Faraday ion collecting device and amplifier are replaced by an interface (109) and an ion counter (IIC) (111). The interface (109) comprises the parts shown in FIG. 2 and numbered from (109) to (113a). Thus, the interface (109) includes a tagging chamber (105a), tagged ion conduit (110), extraction outlet (110a), tagging particle generator (112), tag conduit (113) and an ion inlet (113a) that let ions into the tagging chamber (105a).

The interface is provided with electronic controls (not shown in FIG. 2) which are synchronised with the IMS BN gate (103) and read the BN gate opening time when the flow of ions (104) from the ionisation chamber (102) enters into the drift tube chamber (105). In operation, the ion cloud (104) from the drift tube (105) enters the tagging chamber (105a) of the interface (109) where ions are tagged with tagging objects (114) generated in the tagging particle generator (112) and delivered to the tagging chamber (105a) via conduit (113). Tagged ions are drawn into an extraction outlet (110a) which extends into an extraction conduit (110) which in turn leads to an IIC (111) where tagged ions are individually counted. The individual ion counting device (211) is one which does not require its own tagging chamber and tagging particle generator because these, elements (212) and (213), are integrated into the interface (209).

It should be noted that, for the apparatus shown in FIG. 2, the data acquisition time of the IIC should be shorter than or of equal length to the signal peak separation or duration time in an IMS spectrum. Fulfilling this condition is important if ion detection is to be achieved with the same resolution as can be achieved using the Faraday cup.

If the data acquisition frequency of an IIC is insufficient to match the resolution of the IMS, then another BN-gate can be included in the apparatus to provide closer control of the movement of ions into the tagging chamber thereby enabling the detection of a signal of molecules of interest without compromising the resolution.

Figure 3A:
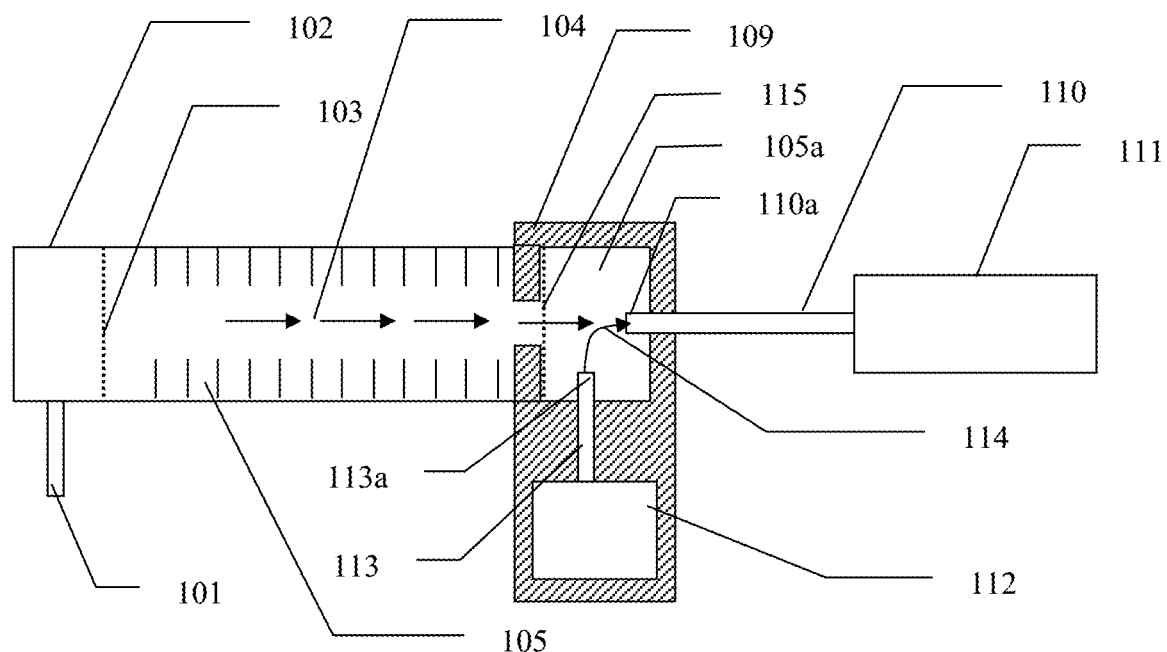
FIG. 3a is a schematic cross-sectional view of an apparatus similar to that shown in FIG. 2 but which has a second Bradbury Nielsen (BN) ion gate. The BN ion gate is located inside the interface and is shown as being open (the arrows show the flow of ions into the interface).

An embodiment of the invention which has a second BN-gate (115) is shown in FIG. 3a. In this embodiment, the tagging chamber contains all the elements shown in FIG. 2 and the second BN gate (115). In operation, when the second BN gate (115) is open, ions pass through the ion gate into the tagging chamber (105a) and face the extraction conduit (110) via opening (110a). The tagging aerosol generator (112) supplies a constant flow of tagging objects in the form of aerosol particles (114) which pass along tag conduit (113) through the tagging aerosol inlet and into the tagging chamber (105a) between the second BN gate (115) and the opening (110a) in the extraction conduit (110). Near the opening (110a) at the inner end of the extraction conduit (110), ions collide with the aerosol particle tags and are urged into the extraction conduit (110) by the pressure difference created by the flow maintenance system of the IIC device. In the conduit (110) ions are tagged further and are directed to the tagged ion separator of the IIC ion counter (111) and then on to an optical counter as described in U.S. Pat. No. 7,372,020 B2. Finally, the number of ions is numerically counted by the optical counter.

FIG. 3a shows the mode of action when the second BN gate (115) is opened. Normally it is opened for a short time to let only ions of interest pass through into the interface zone towards the conduit (110) by a gate control circuit (not shown in FIG. 3a) and an associated electronic controller. The electronic controller controls the operation of the gate (115) to enable opening times to be synchronised with the opening times of the first BN gate (103).

Figure 3B:
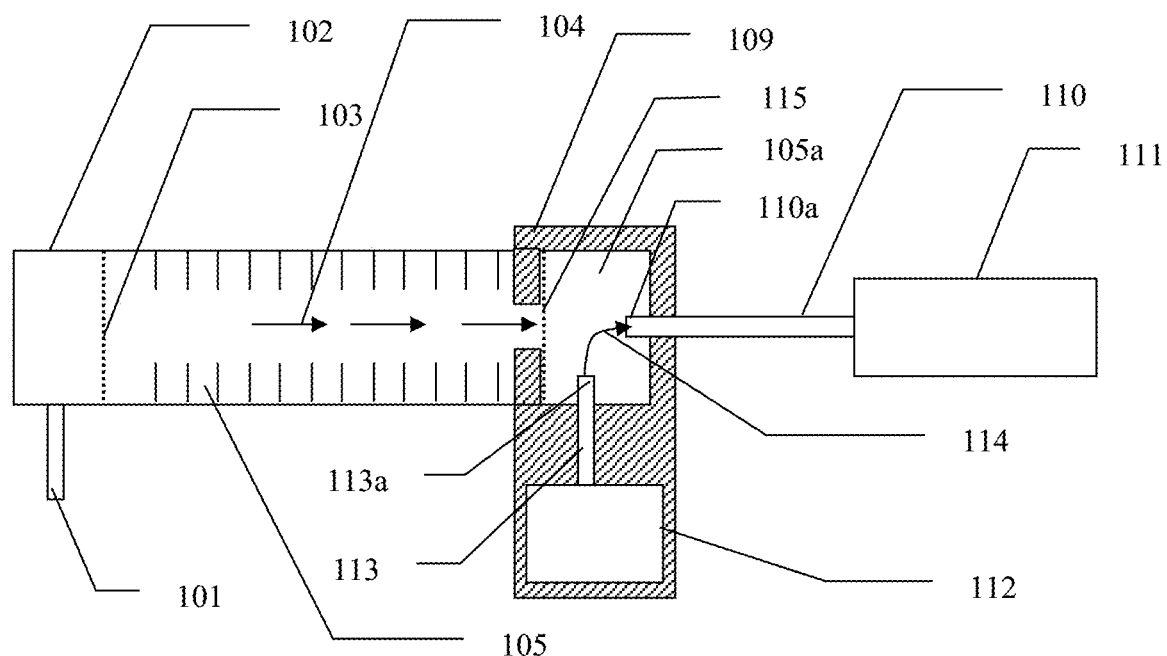
FIG. 3b corresponds to FIG. 3a except that the BN ion gate is shown as being closed.

When the second BN gate (115) is closed as shown in FIG. 3b, ions (104) travelling through the separation chamber (105) cannot get through the second BN gate (115) and into the tagging chamber (105a). In this case, the flow of tagging particles (114) into the conduit (110) via inlet (110a) and thence to the NMT ion counter (111) continues but the neutral non-ionised tagging particles are not directed to the optical particle counter and therefore are not counted. This gives a zero count signal enabling practically zero background counts, The variation in the second and first BN-gate delay times enables the second BN gate (115) to be tuned so that it is opened on arrival of ions of interest at the gate thereby allowing the ions of interest to pass to the IIC. The delay time between the closing of the first ion gate (103) and the second ion gate (115) can be varied across a range of times to enable detection of several different compounds in a complex molecular sample, thereby enabling a drift time spectrum of ions to be recorded which is similar to the drift time spectra obtained from an IMS or a time-of-flight MS. When using the second BN-gate, resolution is not compromised even if the data acquisition time of IIC is considerably greater than the signal peak separation or duration time of the IMS.

Figure 4:
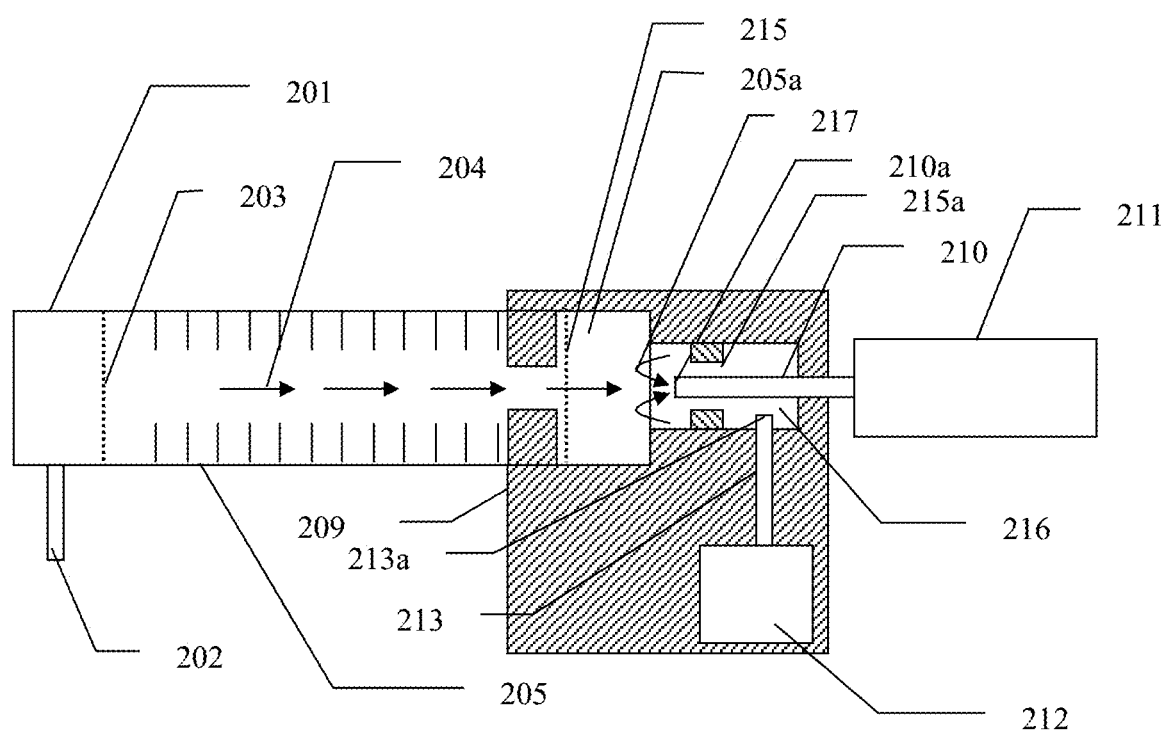
FIG. 4 is a schematic cross-sectional view of an apparatus including an interface for connecting an IMS with an IIC according to another embodiment of the invention. In the embodiment shown in FIG. 4, the interface comprises a two-compartment chamber whereby a first compartment contains a second BN gate, and the second compartment contains a tagging particle inlet, a tag flow homogeniser and a tagging zone.

FIG. 4 shows an apparatus including an interface for connecting an IMS with an IIC according to another embodiment of the invention. In the embodiment shown in FIG. 4, the interface (209) comprises a first tagging compartment (205a), with a second BN-gate (215) positioned near the ion stream inlet (204) to the tagging compartment, and a second compartment (216), which is adjacent the tagging compartment (205a). A tagging particle flow generated in the tagging particle generator (212) and conduit (213) supply tags via the conduit outlet (213a) into the second compartment (216); tags from the second compartment (216) enter the tagging compartment (205a) through an annular opening (215a) in the compartment (216) which surrounds extraction conduit (210) leading to the IIC (211), the IIC being one which does not contain a tagging particle generator and a tagging chamber.

The mode of action of the embodiment shown in FIG. 4 is equivalent to that of the embodiment illustrated in FIGS. 3a and 3b. However, the interface apparatus shown in FIG. 4 has the advantage of being able to provide better tagging efficiency. The flow of tagging objects (aerosol particles) forms a funnel near the entrance (210a) of the extraction conduit (210) and this enables more ions to be drawn into the conduit (210) and hence directed to the IIC ion counter (211). The second compartment (216) with a narrow tag outlet (215a) is designed to provide a close to axially symmetrical uniform flow with velocity profile that is more homogeneous than in the embodiment in FIG. 3.

This compartment acts as a flow homogeniser. In this manner the tag particle flow (217) forms a sheath flow around ions (214) reducing the possibility that ions can be captured by the internal walls of conduit (210). This increases the probability of ions being tagged.

Figure 5:
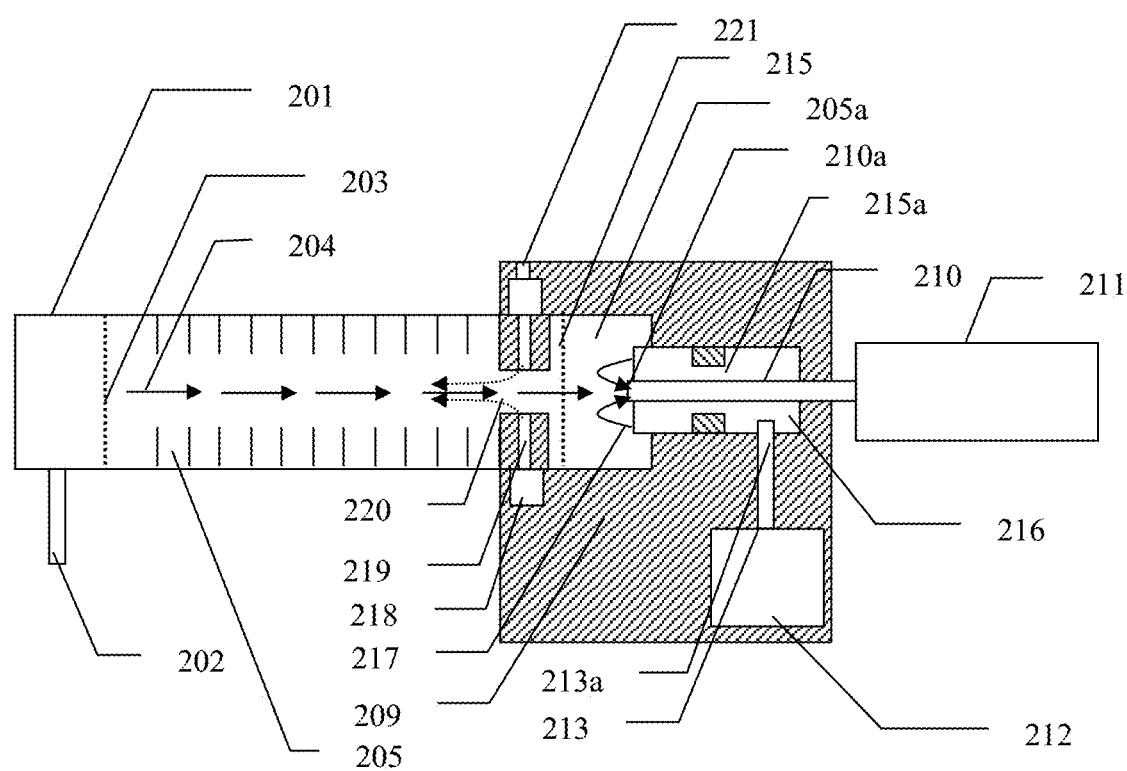
FIG. 5 is a schematic cross-sectional view of an apparatus of an interface connecting an IMS with an IIC wherein the interface comprises a two-compartment chamber as in FIG. 4, but with two flow homogenisers wherein the second flow homogeniser supplies a clean air flow to the IMS drift tube. A tagging particle generator is a part of the interface.

FIG. 5 shows a cross-section of a further embodiment of the interface for connecting an IMS with an IIC. In this embodiment, the interface comprises a two-compartment chamber as in FIG. 4, but is provided with two flow homogenisers. The second homogeniser (218) to (221) supplying a clean air flow shown with a dotted line (220) to the IMS drift tube.

The additional clean flow homogeniser supplies a flow of clean air from a flow generating means (not shown) to the IMS drift tube (205) to reduce contamination of the drift tube that currently employed in some IMS designs. It operates exactly as in embodiments described above, but with the clean air filtered from the particulate matter and VOCs (using molecular sieves and activated carbon) being introduced into the clean air inlet (221) wherein the flow is distributed in the flow distributer (218) and enters into the first compartment (205a) of the tagging chamber via a narrow disc-shaped conduit (219). It is important that the disc-shaped conduit (219) creates a small pressure drop between the flow distributer cavity (218) and the IMS drift tube (205). It should be clear to every person skilled in the art how to do this. The pressure drop should be sufficient to generate uniform axially symmetrical velocity field (220) coming from the disk-shaped conduit (219).

Figure 6:
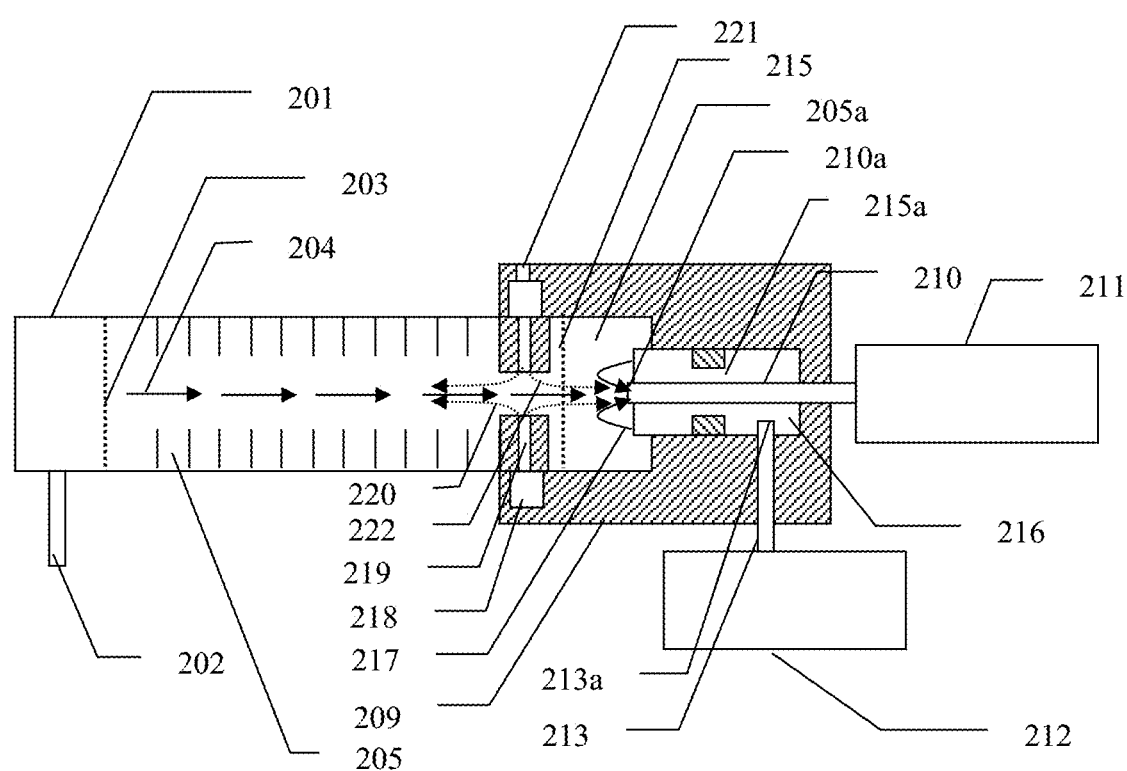
FIG. 6 shows a cross-section of an interface connecting an IMS with an IIC wherein the interface comprises a two-compartment chamber as in FIG. 5, but with the second homogeniser supplying a clean air flow to the IMS drift tube and to the interface tagging zone.

It should be understood that the tagging particle generator can be positioned inside the interface (e.g. be formed as an integral part of the main body of the interface) and be an integral part of the interface (209) as in FIG. 2-FIG. 4, or it can instead be located inside the IIC (211). The first option (the integrated tagging particle generator) is preferable especially when the apparatus is intended to detect analytes at very low concentrations. The latter option, which is less preferable, may be used when sensitivity is not a challenge, e.g. for detection of analytes at higher concentrations. FIG. 6 shows a cross-section of an interface with two homogenisers connecting an IMS with an IIC wherein the interface comprises a two-compartment chamber as in FIG. 5, but with the second homogeniser supplying a clean air flow to the IMS drift tube and to the interface tagging zone. It is advantageous to direct the clean air coming though the clean air inlet (221), the distributer (218) and the narrow conduit (219) to both sides: to the IMS drift tube (205) and the interface (209). Therefore, the clean air flow exiting the narrow conduit (219) is divided into two portions: one portion shown as in FIG. 5 with a dotted line (220) is directed to the drift tube (205) and the second shown with a dotted line (222) is directed to the conduit (210). It is to further prevent tag particles (217) and tag vapour entering the IMS drift tube. It also helps to focus ions into the middle of the conduit (210) connected to the IIC (211) and reduce ion loses in the interface. For this the tag flow rate Qtag should be less than the tagged ion flow rate Qti: Qtag<Qti. At the same time the difference (Qti−Qtag)<Qclean, where Qclean is the flow rate of the clean air at the inlet (221). The second condition defines the flow rate in the IMS drift tube that should not be zero or negative (here negative flow rate refers to the drift gas moving along the ions—from left to the right). As an example, if Qtag is 0.5 l/min and Qti=1 l/min then Qclean should be in the range from 0.6 l/min to 1 l/min. It should be noticed that these values of flow rates are only for illustration purpose. In practice, the difference between the Qclean and the (Qti−Qtag) should match the requirements of the IMS drift flow rate.

Figure 7:
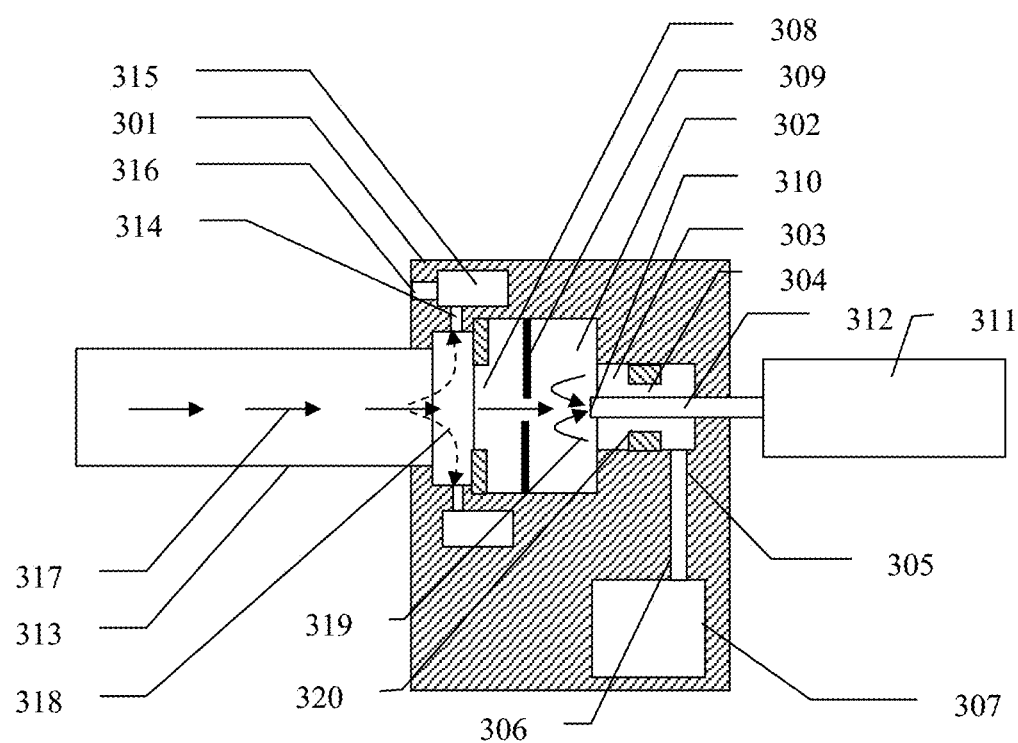
FIG. 7 shows a cross-section of an interface connecting an ion filter device, e.g. FAIMS, with an IIC wherein the interface comprises a two-compartment chamber as in FIG. 6.

FIG. 7 shows a cross-section of an interface connecting an ion filter device such as FAIMS, DMS or ion DMA (e.g. U.S. Pat. No. 10,458,946—the contents of which are incorporated herein by reference), with an IIC wherein the interface (301) comprises a two-compartment chamber with a tagging compartment (302) and a tag flow homogenising compartment (303). The tagging flow homogenising compartment (303) includes a narrow flow conduit (304) an outlet of tags (305) that is in fluid communication through conduit (306) with the tagging particle generator (307). The tagging compartment (302) comprises an inlet of ions (308), an ion flow controlling electrode (309), an outlet of tagged ions (310), leading to an IIC (311) via conduit (312). Between an ion filter device (313) and tagging compartment (302) of the interface (301) a flow homogeniser is positioned. The flow homogeniser comprises a narrow disc shape conduit (314), leading to a flow distributer (315) and a connector (316).

The electrode (309) inside the tagging compartment plays the same role as a BN-gate described in above embodiments, e.g. in FIG. 6 and therefore it can be replaced with a BN-gate.

In all of the embodiments described herein, an electrode with an orifice can be used as well as a BN-gate to control ion flow. The choice of a BN-gate or an electrode with an orifice is typically influenced by the application. For example, when IMS is interfaced with an IIC, a BN-gate is preferable because it gives better resolution, but with a DMA an electrode would be preferable because it enables the generation of an electric field that pulls ions from the ion filter (313) to the zone of the tagging compartment where tags are present. The electrode also can increase the sensitivity by focusing ion flow (317).

In operation, the flow containing ions (317) enters the interface (301) where it is divided; a fraction of the flow (318) being diverted to the narrow conduit (314) and through the flow distributer (315) and the connector (316) to waste, whereas the rest of the flow containing the ions enters the tagging zone of the tagging compartment (302) near the outlet (310). In the tagging zone, the tag flow (319) and ions are mixed, and ions are tagged. The tagged ions are drawn into the inlet (310) and via the conduit (312) to the IIC (311) where tagged ions are individually counted.

The electrode (309) is connected to a voltage supply that generates an electric field to pull ions towards the tagging zone. The conduit (312) may or may not have a certain electric potential difference to improve ion transmission from the electrode (309) to the IIC (311). The electric potential differences are influenced by the geometry and the flow rates of the tags (319) as well as ions (317). Any person skilled in the art should be able to evaluate the voltages required. It is generally preferable to use a conductive materials or electrically dissipative materials for internal surfaces of the tagging chamber to reduce or eliminate the building up of electrostatic charges on the surfaces that can potentially influence the ion transmission from the ion filter (313) to IIC (311).

Ion filters provide flows with ions of selected mobility with a certain flow rate. An IIC has an optimal flow rate that may or may not be equal to the flow of selected ions. Therefore, an interface (301) should preferably have a flow homogeniser (314)-(316) that enables disposal of a part of the flow containing selected ions (318). If the flow rate coming out of the selecting device is too small, then the flow homogeniser can be used to supply flow in the interface, as shown in FIG. 8.

The narrow conduit (304) can be an integral part of the interface body (301) or it can be manufactured as a separate part (320) and then inserted into the interface. The insert can be electrically insulated from the rest of the interface (301) to create an additional force to direct ions to the tagging zone.

Figure 8:
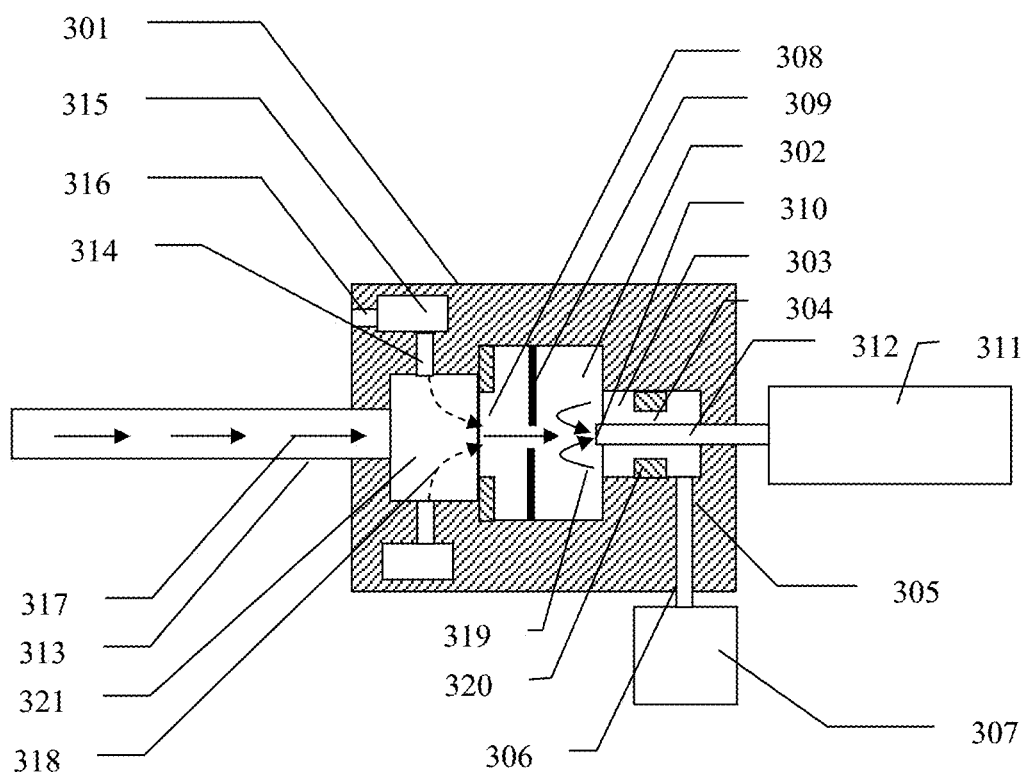
FIG. 8 shows a cross-section of an interface connecting a GC with an IIC wherein the interface comprises an ionisation chamber and two compartment tagging chamber as in FIG. 7. However, in this embodiment, the tagging particle generator is not an integral part of the body of the interface but is a separate element which is positioned in close proximity to the interface.

FIG. 8 shows a cross-section of an interface connecting a GC capillary column (313) with an IIC wherein the interface comprises an ionisation chamber (321) and a two-compartment tagging chamber as shown in FIG. 7. The mode of operation of this embodiment is similar to the operation of the embodiment in FIG. 7, but with one difference; namely that a GC separates molecules and therefore molecules need to be ionised before being counted by the IIC (311). In this embodiment, as in the other embodiments illustrated, the IIC does not need to have its own tagging particle generator or tagging chamber as these form part of the interface device of the invention.

In the apparatus of FIG. 8, the tagging particle generator (307) is not an integral part of the main body of the interface but is positioned in close proximity to the main body of the interface (301) and is connected to the tagging chamber by a short conduit (305). While the use of the apparatus of FIG. 8 should give good results, a still further improvement in sensitivity may be achievable by making the tagging particle generator an integral part of the main body of the interface in order to minimise the length of any conduit between the tagging particle generator and the tagging chamber, thereby reducing background noise caused by ionisation of the tagging particles by cosmic rays.

Figure 9:
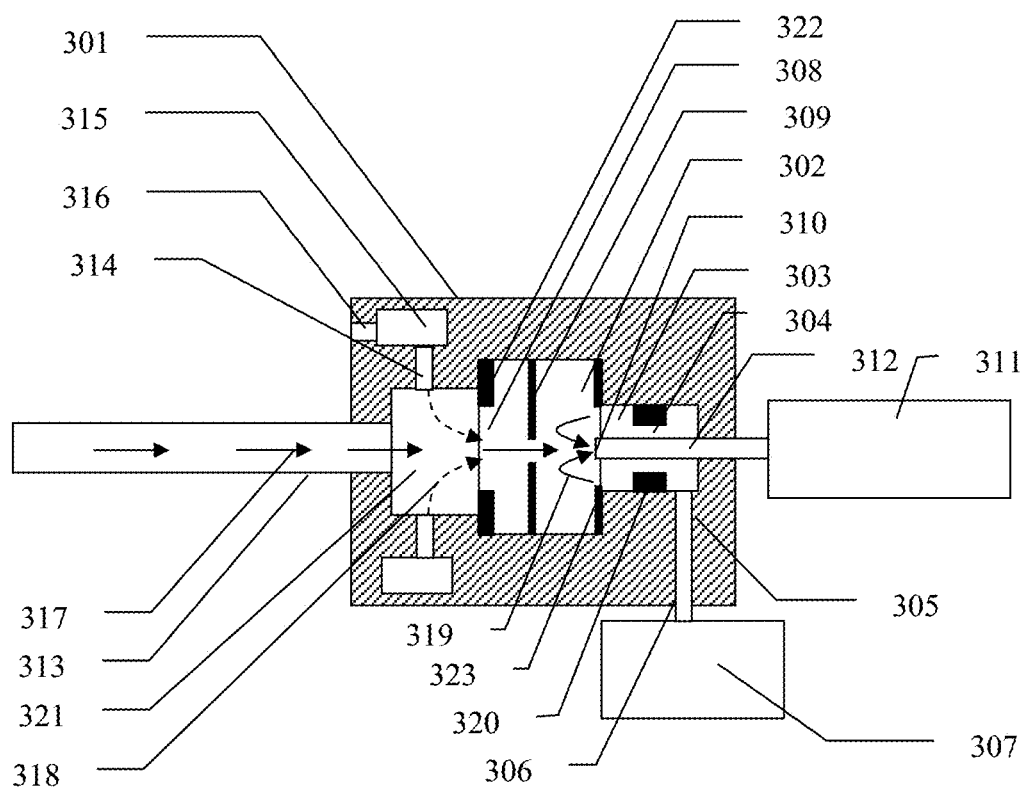
FIG. 9 shows a cross-section of an interface connecting a GC with an IIC wherein the interface comprises an ionisation chamber and two compartment tagging chamber as in FIG. 8 and with a number of electrodes to control movements of ions.
Figure 10:
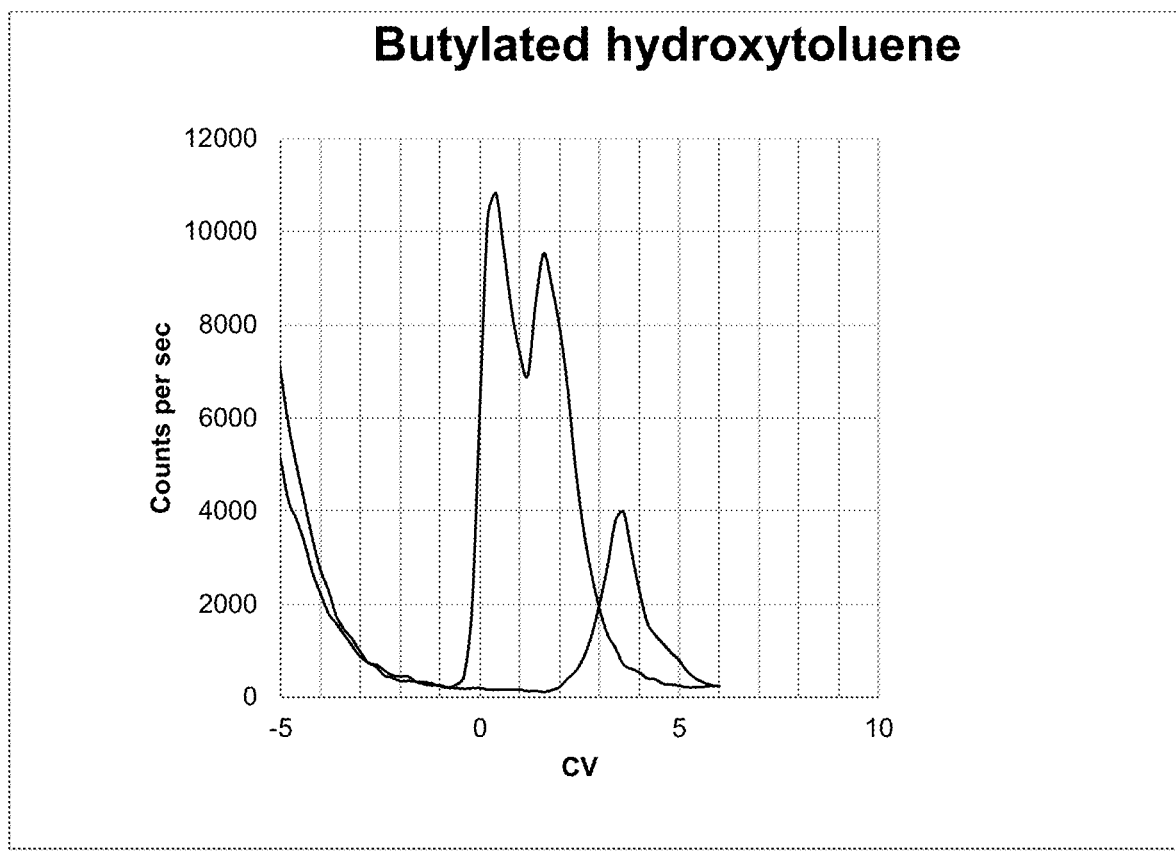
FIG. 10 shows the spectra of lung cancer biomarkers recorded with an interface according to FIG. 7 connecting a FAIMS (Lonestar, OS) ion filter and an IIC device. A number of ions count rate (Counts per second) measured vs. FAIMS compensation voltage (CV), in Volts. A sample of butylated hydroxytoluene was recorded at 25° C.
Figure 11:
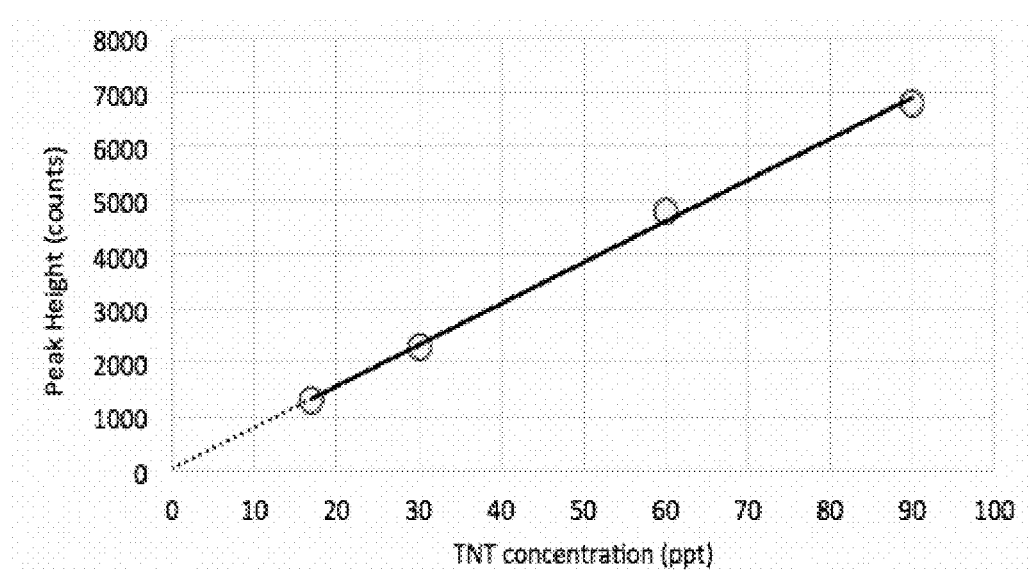
FIG. 11 shows the calibration line for Trinitrotoluene (TNT) vapour obtained with a FAIMS interfaced with an IIC (FAIMS-Interface-IIC). The TNT concentration was obtained by dynamic dilution of a vapour saturated with TNT at 25° C.

FIG. 9 shows a cross-section of an interface connecting a GC with an IIC wherein the interface comprises an ionisation chamber and two-compartment tagging chamber as shown in FIG. 8 and a number of electrodes to control movements of ions. The electrodes are placed inside the tagging chamber: for example an electrode (322) is located between the ionisation chamber (321) and the tagging compartment (302) of the interface (301). Another additional electrode (323) is located on the surface between the tagging compartment (302) and the electrode (320) inside the homogeniser compartment (303). Each electrode has at least one orifice for ions to pass through.

In this embodiment there are four electrodes: (309), (320), (322) and (323). It is advantageous to create an electric field between the electrodes that helps ions to travel between the outlet of the GC column (313) and the inlet (310) of the conduit (312) leading to IIC (311). The electric field can be chosen empirically to achieve a higher ion transfer rate between the ionisation chamber (321) and the IIC (311). The electric field may be constant, as for example in in an IMS device, or it can form a non-linear function of a concave or convex shape. A skilled person will readily be able to estimate the voltage differences between electrodes needed to achieve a desired movement of ions.

EXAMPLES

Example 1

An IMS as shown in FIG. 3 was made in which the tagging aerosol conduit (213), the extraction conduit (210) and the manifold tube (215) were manufactured from stainless steel tubes.

As an alternative to stainless steel tubes and conduits, other materials such as other metals and alloys, e.g. brass, aluminium, glass or plastic, can be used. Preferably the conduits and tubes are made from electrically conductive materials or non-conductive materials with an electro-conductive layer on the surface. Such a layer can be made by metal plating, vacuum deposition or painting with a conductive paint.

The second BN gate (209) was made from gold plated brass shim with dimensions identical to the dimensions of the first BN gate (203). The NMT detector (211) including the tagging aerosol generator (212) was built as disclosed in U.S. Pat. No. 7,372,020, but then the tagging particle generator (212) was removed from the IIC and integrated into the interface. The second BN gate controlling circuit was built based on a microcontroller unit with the trigger input synchronized by the first gate trigger signal and with programmable time-varying parameters for the gate delay time and gate opening time.

The controlling circuit enables programmable time variation of the second gate delay time from 0 ms to 20 ms (or up to maximum IMS scanning time) and the second gate opening time in the range from 1 μs to 20 ms (or up to maximum IMS scanning time).

Example 2

An ion counter of the type disclosed in U.S. Pat. No. 7,372,020 was interfaced with an IMS lonscan 400B (Barringer) using an embodiment of the present invention shown in FIG. 2. The stainless steel conduit (110) was manufactured from a tube of 2 mm ID. Tagging aerosol particles of 100 nm diameter were generated from sebacate by an aerosol generator of the type disclosed in U.S. Pat. No. 7,372,020. The flow rate of aerosol particle tags in the tag conduit (113) was 0.2 $l/min^{-1}$. The flow rate of tagged ions in the conduit (110) was 0.2 $l/min^{-1}$.

An example of data recorded with the above-described IMS-NMT (IMS-ion counter) is shown in FIG. 4.

Example 3

Table 1 contains data for another example demonstrating an increase in sensitivity. In this example, an Excellims MA3100 IMS was interfaceds with an NMT detector. Here replacement of the Faraday cup detector by the NMT ion counter resulted in the reduction of the Limit Of Detection at 90% confidence (LOD90) by ~10 times for both TNT and RDX [2,3].

TABLE 1

ASTM LOD90 results for IMS-NMT with the Excellims MA3100 and IMS-Faraday cup.

| Substance | LOD90 (ASTM) IMS-NMT | LOD90 (ASTM) IMS-Faraday cup |
|---|---|---|
| TNT | 38 pg | 327 pg |
| RDX | 8.6 pg | 95 pg |
| PETN | 32 pg | Not detectable |

EMBODIMENTS OF THE INVENTION

The following are embodiments of the invention:

1. An apparatus comprising:
   (i) an ion selecting device;
   (ii) an individual ion counting device;
   (iii) an interface device integral with the ion selecting device and being located downstream of an ion separating chamber of the ion selecting device, the interface device comprising a tagging particle generator and a tagging chamber, the tagging chamber having:
   a sample ion inlet;
   a tagging particle inlet; and
   a extraction outlet;
   the individual ion counting device being one which has a and a tagged ion counter and a tagged ions separator for separating tagged ions and uncharged neutral tagging particles prior to counting of the tagged ions but preferably does not have its own operational tagging chamber and tagging particle generator;

the sample ion inlet being arranged to receive from the ion selecting device a sample gas containing a cloud of ions of a selected mobility; the tagging particle inlet being in fluid communication with a gas conduit supplying uncharged neutral tagging particles from the tagging particle generator; and the extraction outlet being in fluid communication with the tagged ions separator of the individual ion counter device;

wherein the apparatus is set up so that in use the cloud of ions of selected mobility entering the tagging chamber through the sample ion inlet is exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are counted after being separated from the uncharged neutral tagging particles;

and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber by reverse flow through the sample ion inlet.

1A. An apparatus comprising:
(i) an ion selecting device which is an ion mobility spectrometer;
(ii) an individual ion counting device which comprises a tagged ions separator and a tagged ions counter selected from an optical particle counter and a condensation particle counter;
(iii) an interface device integral with the ion selecting device and being located downstream of an ion separating chamber of the ion selecting device, the interface device comprising a tagging particle generator and a tagging chamber, the tagging chamber having:
  a sample ion inlet;
  a tagging particle inlet; and
  an extraction outlet;
the individual ion counting device being one which does not have its own operational tagging chamber and tagging particle generator;
the sample ion inlet being arranged to receive from the ion selecting device a sample gas containing a cloud of ions of a selected mobility; the tagging particle inlet being in fluid communication with a gas conduit supplying uncharged neutral tagging particles from the tagging particle generator; and the extraction outlet being in fluid communication with the tagged ions separator of the individual ion counter device;
wherein the apparatus is set up so that in use the cloud of ions of selected mobility entering the tagging chamber through the sample ion inlet is exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;
and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber by reverse flow through the sample ion inlet.

2. An apparatus according to 1 or 1A wherein the ion selecting device is an ion mobility spectrometer comprising a drift tube in which ions are separated by ion mobility.

3. An apparatus comprising:
(i) a molecule selecting device;
(ii) an individual ion counter device;
(iii) an interface device integral with the molecule selecting device and being located at a downstream outlet thereof, the interface device comprising (a) an ionisation chamber containing an ionising device for ionising molecules received from the molecule selecting device; (b) a tagging particle generator; and (c) an tagging chamber, wherein the tagging chamber has:
  a sample ion inlet for receiving ions from the ionisation chamber;
  a tagging particle inlet, and a extraction outlet;
  the sample ion inlet being arranged to receive a cloud of ions from the ionisation chamber; the tagging particle inlet being in fluid communication with a gas conduit supplying uncharged neutral tagging particles from the tagging particle generator; and the extraction outlet being in fluid communication with the individual ion counter device;
the individual ion counting device being one which does not have its own operational tagging chamber and tagging particle generator;
the tagging chamber being formed from an electrically conductive material or a material treated to render it electrically conductive;
wherein the apparatus is set up so that selected molecules leaving the molecule selecting device enter the ionisation chamber where they are ionised and then enter the tagging chamber through the sample ion inlet whereupon they are exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the individual ion counting device where the tagged ions are counted;
and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ionisation chamber through by reverse flow through the sample ion inlet.

3A. An apparatus comprising:
(i) a molecule selecting device;
(ii) an individual ion counter device which comprises a tagged ions separator and a tagged ions counter selected from an optical particle counter and a condensation particle counter;

(iii) an interface device integral with the molecule selecting device and being located at a downstream outlet thereof, the interface device comprising (a) an ionisation chamber containing an ionising device for ionising molecules received from the molecule selecting device; (b) a tagging particle generator; and (c) a tagging chamber, wherein the tagging chamber has:
a sample ion inlet for receiving ions from the ionisation chamber;
a tagging particle inlet, and
an extraction outlet;
the individual ion counting device being one which does not have its own operational tagging chamber and tagging particle generator;
the sample ion inlet being arranged to receive a cloud of ions from the ionisation chamber; the tagging particle inlet being in fluid communication with a gas conduit supplying uncharged neutral tagging particles from the tagging particle generator; and the extraction outlet being in fluid communication with the tagged ions separator of the individual ion counter device; the tagging chamber being formed from an electrically conductive material or a material treated to render it electrically conductive;
wherein the apparatus is set up so that selected molecules leaving the molecule selecting device enter the ionisation chamber where they are ionised and then enter the tagging chamber through the sample ion inlet whereupon they are exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;
and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ionisation chamber through by reverse flow through the sample ion inlet.

4. An apparatus according to 3 or 3A wherein the molecule selecting device is a gas chromatagraph.

5. An apparatus according to any one of 1 to 4 wherein an ion-flux control element is located at or adjacent the sample ion inlet, the ion-flux control element being operable to control the flow of ions into the tagging chamber from the ion selecting device or ionisation chamber as the case may be.

6. An apparatus according to 5 wherein the ion-flux control element is an ion gate.

7. An apparatus according to 6 wherein the ion gate is a Bradbury Neilsen ion gate or an electrode ion gate.

8. An apparatus according to any one of 1 to 7 wherein the tagging particle generator generates an aerosol of liquid tagging particles.

9. An apparatus according to 2 and any embodiment dependent thereon wherein the extraction outlet and the drift tube are in line and lie on a common axis extending through the drift tube and tagging chamber.

10. An apparatus according to any one of 1 to 9 wherein the tagging chamber has axial symmetry.

11. An apparatus according to 5 and any embodiment dependent thereon wherein the tagging particle inlet is disposed laterally (e.g. orthogonally) with respect to a direct flow path between the ion-flux control element and the extraction outlet.

12. An apparatus according to any one of 1 to 11 wherein the tagging chamber comprises two compartments; wherein the first of the two compartments receives untagged ions from the ion selecting device or the ionisation chamber; the second of the two compartments is further from the sample ion inlet than the tagging compartment; and the tagging particle inlet opens into the second compartment; and wherein the second compartment is configured and arranged relative to the first compartment such that a sheath flow of the uncharged neutral tagging particles is created which surrounds ions entering the extraction outlet.

13. An apparatus according to 12 wherein the uncharged neutral tagging particles flow from the tagging particle inlet towards the extraction outlet in a direction opposite to a direction of flow of the cloud of ions from the sample ion inlet towards the extraction outlet.

14. An apparatus according to 12 or 13 wherein the extraction outlet is an open end of a extraction conduit, and the extraction conduit extends through the second compartment so as to create an annular channel along which the uncharged neutral tagging particles pass from the tagging particle inlet towards the extraction outlet.

15. An apparatus according to 14 wherein the extraction conduit extends along an entire length of, or the greater part of the length of, the second compartment.

16. An apparatus according to 14 or 15 wherein the annular channel has a region of reduced width, the region of reduced width being located between the tagging particle inlet and the extraction outlet.

17. An apparatus according to 16 wherein the region of reduced width is provided by an annular baffle which extends radially inwardly from a wall of the second compartment part way towards the extraction conduit.

18. An apparatus according to any one of 14 to 17 wherein the extraction conduit and the drift tube (or ionisation chamber when present) are in line and lie on a common axis extending through the drift tube (or ionisation chamber) and tagging chamber.

19. An apparatus according to any one of 14 to 18 wherein the tagging particle inlet is located orthogonally with respect to the extraction conduit.

20. An apparatus according to any one of 12 to 19 wherein an ion-flux control element (e.g. an ion gate such as a Bradbury Neilsen ion gate or an electrode ion gate) is located inside the first compartment.

21. An apparatus according to any one of 12 to 20 wherein the interface comprises a gas flow control zone upstream of the first compartment, wherein an inner peripheral wall of the interface in the control zone is provided with one or more openings or channels through which:
(a) a supply of clean gas (e.g. clean air) can be provided to form a clean gas (e.g. air) stream into the drift tube (when present); or
(b) a supply of clean gas (e.g. clean air) can be introduced into the tagging compartment; or
(c) a supply of clean gas (e.g. clean air) can be introduced into both the tagging compartment and the drift tube (when present); or
(d) a fraction of a gas flow from the ion selecting chamber can be extracted.

20. An apparatus according to 19 wherein the inner peripheral wall of the interface in the control zone is provided with an annular channel which is open on a radially inner side thereof and which is coaxial with a common axis extending through the drift tube (when present) and tagging chamber, wherein the annular channel is in fluid communication with one or more openings to the exterior of the interface through which clean gas (e.g. air) can be introduced or the said fraction of the gas flow from the drift tube withdrawn.
21. An apparatus according to any of the preceding embodiments wherein a plurality of electrodes are positioned inside the tagging chamber, the electrodes having predefined or controllable electric potential differences so as to generate a graduated electric field to facilitate movement of ions from the ion selecting device or the ionisation chamber as the case may be to the extraction outlet and on to the individual ion counter device.
22. An apparatus according to 21 wherein the electrodes are made from a metal or metal alloy or from a non-electrically-conductive material having a metallised surface and have one or more openings therein through which ions can pass.
23. An apparatus according to any one of the preceding embodiments wherein the tagging chamber is formed from a metal or metal alloy such as stainless steel.
24. An apparatus according to 23 wherein, when the tagging chamber is provided with one or more electrodes and/or ion gates, the electrodes and ion gates are separated from the metal material by electrically insulating material.
25. An apparatus according to any one of 1 to 22 wherein the tagging chamber is made from a non-electrically conductive material (e.g. PTFE, PEEK, glass, ceramic or plastic) or is made from a metal or alloy that contains non-electrically conductive sections to insulate any electrodes or ion gates that may be present.
26. An apparatus according to any one of 1 to 22 wherein the tagging chamber is made from a non-electrically conductive material (e.g. PTFE, PEEK, glass, ceramic or plastic) and one or more electrodes for controlling ion flow through the tagging chamber are located outside the chamber.
27. An apparatus according to any one of the preceding embodiments wherein a selected electric potential difference is applied to the extraction outlet or the tagged ion conduit (when present).
28. An apparatus according to 1 and any embodiment dependent thereon which comprises a molecule selecting device (such as a gas chromatagraph) connected upstream of the ion selecting device.
29. An apparatus according to any one of 1 to 28 wherein the interface device comprises a main body and the tagging particle generator and tagging chamber are an integral part of (e.g. integrally formed with) the main body.
30. An apparatus according to any one of 1 to 28 wherein the interface device comprises a main body, the tagging chamber is integrally formed with the main body, and the tagging particle generator is non-integrally formed with the main body but is located in close proximity to the main body and is connected to the tagging chamber of the interface by a (preferably short) conduit.
31. An interface device for connecting an ion selecting device to an individual ion counter device (preferably one which does not have its own tagging chamber and tagging particle generator); the interface device comprising a tagging particle generator and an tagging chamber, the tagging chamber having:

a sample ion inlet;
a tagging particle inlet; and
a extraction outlet;
the sample ion inlet being arranged to receive a cloud of ions of a selected mobility from the ion selecting device; the tagging particle inlet being in fluid communication with a gas conduit supplying uncharged neutral tagging particles from the tagging particle generator; and the extraction outlet being connectable to the individual ion counter device;
wherein the interface device apparatus is operable so that the cloud of ions of selected mobility entering the tagging chamber through the sample ion inlet is exposed to an excess (relative to the number of ions) of uncharged neutral tagging particles so that the ions collide with the tagging particles to form a mixture of tagged ions (tagging particles with an electric charge) and uncharged neutral tagging particles; the mixture of tagged ions and uncharged neutral tagging particles being drawn through the extraction outlet into the individual ion counting device where the tagged ions are counted;
and wherein the interface device is operable so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber through by reverse flow through the sample ion inlet.
32. An interface device according to 31 having the features defined in any one of embodiments 5 to 30.
33. An apparatus as defined in any one of embodiments 1 to 30 or an interface according to either of embodiments 31 and 32, comprising an electronic controller for controlling the operation of the apparatus or interface.
34. A method of counting ions of a selected ion mobility in a gaseous sample using an ion mobility spectrometer (IMS) and the interface device connected to an individual ion counter as defined herein; which method comprises:
(i) controlling the timing of the opening and closing of an ion gate at the upstream end of the drift tube of the (IMS) and the opening and closing of an ion gate in the tagging chamber to enable ions of the selected ion mobility to pass out of an ionisation chamber of the IMS through the drift tube and into the tagging chamber; (ii) subjecting the ions of selected ion mobility to a flow of tagging particles to produce ionised tagging particles; (iii) extracting ionised tagging particles, non-ionised tagging particles and any residual untagged ions through the extraction outlet of the tagging chamber and directing them to the individual ion counter where tagged ions are extracted, passed through an optical counter and counted individually.
35. A method of counting ions of a selected ion mobility in a gaseous sample using an apparatus as defined herein, which method comprises allowing the ions of selected ion mobility to pass from an ion selecting device though the sample ion inlet into the tagging chamber; exposing the ions to an aerosol of tagging particles so that the ions are tagged by attachment to tagging particles; allowing a mixture of tagged ions and uncharged neutral tagging particles to leave the tagging chamber through the extraction outlet; separating the tagged ions from the uncharged neutral tagging particles; and counting the tagged ions using an individual ion counter.
36. A method according to 34 or 35 wherein the ion selecting device is an ion mobility spectrometer having an ionisation chamber for forming ions from a gas sample containing an analyte of interest; a drift tube in which separation of the ions is effected by being subjected to an electric field; and a first ion gate at an upstream end of the drift tube for controlling passage of the ions into the drift tube, wherein a second ion gate either is present at a downstream end of the drift tube in front of the sample ion inlet of the tagging chamber, or is present inside the tagging chamber on a downstream side of the sample ion inlet; and the method comprises:
  (i) controlling the timing of the opening and closing of the first and second ion gates to enable the ions to pass from the ionisation chamber through the first ion gate into the drift tube and ions of a selected ion mobility to pass through from the drift tube through the second ion gate into the tagging chamber;
  (ii) subjecting the ions of selected ion mobility to a flow of uncharged neutral tagging particles to produce ionised tagging particles (tagged ions);
  (iii) extracting ionised tagging particles, non-ionised tagging particles and any residual untagged ions through the extraction outlet of the tagging chamber and directing them to the individual ion counter where tagged ions are extracted, passed through an individual ion counter (such as an optical particle counter) and counted individually.

37. An apparatus or method according to any one of the preceding embodiments wherein the ion selecting device is an ion mobility spectrometer (IMS) such as a Drift Time Ion Mobility Spectrometer (DTIMS), a Field Asymmetric waveform Ion Mobility Spectrometer (FAIMS), a Differential Mobility Spectrometer (DMS), a Differential Mobility Analyser (DMA), and a Variable Electric Field Mobility Analyser (VEFMA) (e.g. as disclosed in U.S. Pat. No. 8,378,297B2.

38. An ion mobility spectrometer comprising:
  (a) an ionisation chamber having a sample gas inlet through which a sample gas can enter the ionisation chamber, the ionisation chamber being provided with an ion-creating device for creating ions from components of the sample gas;
  (b) an ion separation chamber in fluid communication with the ionisation chamber, the ion separation chamber having one or more electric field-creating elements for creating an electric field for separating ions of differing mobilities;
  (c) a tagging chamber in fluid communication with the ion separation chamber, the tagging chamber having (c-i) a tagging aerosol inlet through which aerosol tagging particles can be introduced into the tagging chamber such that the tagging particles collide with ions received from the ion separation chamber to formed ionised tagging particles; and (c-ii) an extraction outlet for connection to an ion counting device;
  (d) a first ion gate interposed between the ionisation chamber and the ion separation chamber for controlling the flow of ions created in the ionisation chamber into the ion separation chamber;
  (e) a second ion gate interposed between the ion separation chamber and the tagging chamber for controlling the flow of ions from the ion separation chamber into the tagging chamber; and
  (f) an electronic controller linked to the first and second ion gates, the electronic controller being configured to control the opening and closing of the first and second ion gates to permit ions of a selected ion mobility to pass from the ion separation chamber into the tagging chamber.

REFERENCES

R. Cumeras et al., Analyst, 2015, March 7; 140(5): 1376-1390
U.S. Pat. No. 7,372,020 B2, Ion counter; B. Gorbunov.
"Plasma chromatography" Edited by T. W. Carr and published in 1984 by Plenum Press (N-Y, London)
G. A. Eiceman, Ion-mobility spectrometry as a fast monitor of chemical composition, Trends In Analytical Chemistry, 2002, pp. 259-275, vol. 21, No. 4, Elsevier Science B.V.
Ultra-Sensitive Explosives Detection Based on Nanotechnology Molecular Tagging. IRC 2013: Phase 2-36576-271138.
CDE 36705, Phase 1 Final report 2014.

The invention claimed is:
1. An apparatus comprising:
  (i) an ion selecting device which is an ion mobility spectrometer;
  (ii) an individual ion counting device which comprises a tagged ions separator and a tagged ions counter selected from an optical particle counter and a condensation particle counter;
  (iii) an interface device integral with the ion selecting device and being located downstream of an ion separating chamber of the ion selecting device, the interface device comprising a tagging particle generator and a tagging chamber, the tagging chamber having:
    a sample ion inlet;
    a tagging particle inlet; and
    an extraction outlet;
  the individual ion counting device being one which does not have its own operational tagging chamber and tagging particle generator;
  the sample ion inlet being arranged to receive from the ion selecting device a sample gas containing a cloud of ions of a selected mobility; the tagging particle inlet being in fluid communication with a gas conduit supplying uncharged neutral tagging particles from the tagging particle generator; and the extraction outlet being in fluid communication with the tagged ions separator of the individual ion counter device;
  wherein the apparatus is set up so that in use the cloud of ions of selected mobility entering the tagging chamber through the sample ion inlet is exposed to an excess, relative to the number of ions, of uncharged neutral tagging particles so that the ions collide with the tagging particles to form a mixture of tagged ions, said tagged ions being tagging particles with an electric charge, and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;
  and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber by reverse flow through the sample ion inlet.

2. An apparatus according to claim 1 wherein the ion mobility spectrometer is selected from a Drift Time Ion Mobility Spectrometer (DTIMS), a Field Asymmetric waveform Ion Mobility Spectrometer (FAIMS), a Differential Mobility Spectrometer (DMS), a Differential Mobility Analyser (DMA), and a Variable Electric Field Mobility Analyser (VEFMA).

3. An apparatus according to claim 2 wherein the ion selecting device is a DTIMS comprising a drift tube in which ions are separated by ion mobility.

4. An apparatus comprising:
(i) a molecule selecting device;
(ii) an individual ion counter device which comprises a tagged ions separator and a tagged ions counter selected from an optical particle counter and a condensation particle counter;
(iii) an interface device integral with the molecule selecting device and being located at a downstream outlet thereof, the interface device comprising (a) an ionisation chamber containing an ionising device for ionising molecules received from the molecule selecting device; (b) a tagging particle generator; and (c) a tagging chamber, wherein the tagging chamber has:
a sample ion inlet for receiving ions from the ionisation chamber;
a tagging particle inlet, and
an extraction outlet;
the individual ion counting device being one which does not have its own operational tagging chamber and tagging particle generator;
the sample ion inlet being arranged to receive a cloud of ions from the ionisation chamber; the tagging particle inlet being in fluid communication with a gas conduit supplying uncharged neutral tagging particles from the tagging particle generator; and the extraction outlet being in fluid communication with the tagged ions separator of the individual ion counter device; the tagging chamber being formed from an electrically conductive material or a material treated to render it electrically conductive;
wherein the apparatus is set up so that selected molecules leaving the molecule selecting device enter the ionisation chamber where they are ionised and then enter the tagging chamber through the sample ion inlet whereupon they are exposed to an excess, relative to the number of ions, of uncharged neutral tagging particles so that the ions collide with the tagging particles to form a mixture of tagged ions, said tagged ions being tagging particles with an electric charge, and uncharged neutral tagging particles; the mixture of tagged ions and uncharged neutral tagging particles being drawn through the extraction outlet into the tagged ions separator of the individual ion counting device where the tagged ions are separated from the uncharged neutral tagging particles and are then counted by the tagged ions counter;
and wherein the apparatus is set up so that the tagging chamber has an outlet flow rate (Qout) which is greater than a flow rate (Otag) of neutral tagging particles into the tagging chamber through the tagging particle inlet, thereby to prevent tagging particles from entering the ionisation chamber through by reverse flow through the sample ion inlet.

5. An apparatus according to claim 4 wherein the molecule selecting device is a gas chromatagraph.

6. An apparatus according to claim 1 wherein an ion-flux control element is located at or adjacent the sample ion inlet, the ion-flux control element being operable to control the flow of ions into the tagging chamber from the ion selecting device or ionisation chamber as the case may be.

7. An apparatus according to claim 4 wherein an ion-flux control element is located at or adjacent the sample ion inlet, the ion-flux control element being operable to control the flow of ions into the tagging chamber from the ion selecting device or ionisation chamber as the case may be.

8. An apparatus according to claim 1 wherein the tagging particle generator generates an aerosol of liquid tagging particles.

9. An apparatus according to claim 1 wherein the tagging chamber has axial symmetry.

10. An apparatus according to claim 1 wherein the tagging chamber comprises two compartments; wherein the first of the two compartments receives untagged ions from the ion selecting device or the ionisation chamber; the second of the two compartments is further from the sample ion inlet than the tagging compartment; and the tagging particle inlet opens into the second compartment; and wherein the second compartment is configured and arranged relative to the first compartment such that a sheath flow of the uncharged neutral tagging particles is created which surrounds ions entering the extraction outlet.

11. An apparatus according to claim 4 wherein the tagging chamber comprises two compartments; wherein the first of the two compartments receives untagged ions from the ion selecting device or the ionisation chamber; the second of the two compartments is further from the sample ion inlet than the tagging compartment; and the tagging particle inlet opens into the second compartment; and wherein the second compartment is configured and arranged relative to the first compartment such that a sheath flow of the uncharged neutral tagging particles is created which surrounds ions entering the extraction outlet.

12. An apparatus according to claim 10 wherein the interface device comprises a gas flow control zone upstream of the first compartment, wherein an inner peripheral wall of the interface in the control zone is provided with one or more openings or channels through which:
(a) a supply of clean gas can be provided to form a clean gas stream into the drift tube, when present; or
(b) a supply of clean gas can be introduced into the tagging compartment; or
(c) a supply of clean gas can be introduced into both the tagging compartment and the drift tube, when present; or
(d) a fraction of a gas flow from the ion selecting chamber can be extracted.

13. An apparatus according to claim 11 wherein the interface device comprises a gas flow control zone upstream of the first compartment, wherein an inner peripheral wall of the interface in the control zone is provided with one or more openings or channels through which:
(a) a supply of clean gas can be provided to form a clean gas stream into the drift tube, when present; or
(b) a supply of clean gas can be introduced into the tagging compartment; or
(c) a supply of clean gas can be introduced into both the tagging compartment and the drift tube, when present; or
(d) a fraction of a gas flow from the ion selecting chamber can be extracted.

14. An interface device for connecting an ion selecting device to an individual ion counter device, the individual ion counter device being one which has a tagged ions separator for separating tagged ions and uncharged neutral tagging particles prior to counting of the tagged ions but does not have its own operational tagging chamber and tagging particle generator; the interface device comprising a tagging particle generator and a tagging chamber, the tagging chamber having:
- a sample ion inlet;
- a tagging particle inlet; and
- a extraction outlet;

the sample ion inlet being arranged to receive a cloud of ions of a selected mobility from the ion selecting device; the tagging particle inlet being in fluid communication with a gas conduit supplying uncharged neutral tagging particles from the tagging particle generator; and the extraction outlet being connectable to the individual ion counter device;

wherein the interface device apparatus is operable so that the cloud of ions of selected mobility entering the tagging chamber through the sample ion inlet is exposed to an excess, relative to the number of ions, of uncharged neutral tagging particles so that the ions collide with the tagging particles to form a mixture of tagged ions, said tagged ions being tagging particles with an electric charge, and uncharged neutral tagging particles; the mixture of tagged ions and uncharged neutral tagging particles being drawn through the extraction outlet into the tagged ions separator of the individual ion counting device where the tagged ions are counted;

and wherein the interface device is operable so that the tagging chamber has an outlet flow rate (Qout) which is greater than a flow rate (Otag) of neutral tagging particles into the tagging chamber through the tagging particle inlet, thereby to prevent tagging particles from entering the ion selecting chamber through by reverse flow through the sample ion inlet.

15. An interface device according to claim 14 having the features defined in claim 1.

16. A method of counting ions of a selected ion mobility in a gaseous sample using an ion mobility spectrometer (IMS) and the interface device of claim 14 connected to an individual ion counter; which method comprises: (i) controlling the timing of the opening and closing of an ion gate at the upstream end of the drift tube of the (IMS) and the opening and closing of an ion gate in the tagging chamber to enable ions of the selected ion mobility to pass out of an ionisation chamber of the IMS through the drift tube and into the tagging chamber; (ii) subjecting the ions of selected ion mobility to a flow of tagging particles to produce ionised tagging particles; (iii) extracting ionised tagging particles, non-ionised tagging particles and any residual untagged ions through the extraction outlet of the tagging chamber and directing them to the individual ion counter where tagged ions are extracted, passed through an optical counter and counted individually.

17. A method of counting ions of a selected ion mobility in a gaseous sample using an apparatus as defined in claim 1, which method comprises allowing the ions of selected ion mobility to pass from an ion selecting device though the sample ion inlet into the tagging chamber; exposing the ions to an aerosol of tagging particles so that the ions are tagged by attachment to tagging particles; allowing a mixture of tagged ions and uncharged neutral tagging particles to leave the tagging chamber through the extraction outlet; separating the tagged ions from the uncharged neutral tagging particles; and counting the tagged ions using an individual ion counter.

18. A method according to claim 16 wherein the ion selecting device is an ion mobility spectrometer having an ionisation chamber for forming ions from a gas sample containing an analyte of interest; a drift tube in which separation of the ions is effected by being subjected to an electric field; and a first ion gate at an upstream end of the drift tube for controlling passage of the ions into the drift tube, wherein a second ion gate either is present at a downstream end of the drift tube in front of the sample ion inlet of the tagging chamber, or is present inside the tagging chamber on a downstream side of the sample ion inlet; and the method comprises:
  (i) controlling the timing of the opening and closing of the first and second ion gates to enable the ions to pass from the ionisation chamber through the first ion gate into the drift tube and ions of a selected ion mobility to pass through from the drift tube through the second ion gate into the tagging chamber;
  (ii) subjecting the ions of selected ion mobility to a flow of uncharged neutral tagging particles to produce ionised tagging particles;
  (iii) extracting ionised tagging particles, non-ionised tagging particles and any residual untagged ions through the extraction outlet of the tagging chamber and directing them to the individual ion counter where tagged ions are extracted, passed through an individual ion counter and counted individually.

19. A method according to claim 17 wherein the ion selecting device is an ion mobility spectrometer having an ionisation chamber for forming ions from a gas sample containing an analyte of interest; a drift tube in which separation of the ions is effected by being subjected to an electric field; and a first ion gate at an upstream end of the drift tube for controlling passage of the ions into the drift tube, wherein a second ion gate either is present at a downstream end of the drift tube in front of the sample ion inlet of the tagging chamber, or is present inside the tagging chamber on a downstream side of the sample ion inlet; and the method comprises:
  (i) controlling the timing of the opening and closing of the first and second ion gates to enable the ions to pass from the ionisation chamber through the first ion gate into the drift tube and ions of a selected ion mobility to pass through from the drift tube through the second ion gate into the tagging chamber;
  (ii) subjecting the ions of selected ion mobility to a flow of uncharged neutral tagging particles to produce ionised tagging particles;
  (iii) extracting ionised tagging particles, non-ionised tagging particles and any residual untagged ions through the extraction outlet of the tagging chamber and directing them to the individual ion counter where tagged ions are extracted, passed through an individual ion counter and counted individually.

* * * * *